US009396471B1

(12) United States Patent
Kerr

(10) Patent No.: US 9,396,471 B1
(45) Date of Patent: Jul. 19, 2016

(54) SYSTEM AND METHOD FOR RECEIVING TARGETED CONTENT ON A PORTABLE ELECTRONIC DEVICE

(75) Inventor: Michael A. Kerr, Reno, NV (US)

(73) Assignee: NEXRF CORPORATION, Reno, NV (US)

( * ) Notice: Subject to any disclaimer, the term of this patent is extended or adjusted under 35 U.S.C. 154(b) by 0 days.

(21) Appl. No.: 13/612,564

(22) Filed: Sep. 12, 2012

Related U.S. Application Data

(63) Continuation of application No. 12/413,547, filed on Mar. 28, 2009, now Pat. No. 8,942,995, which is a continuation-in-part of application No. 11/948,007, filed on Nov. 30, 2007.

(60) Provisional application No. 61/040,661, filed on Mar. 29, 2008, provisional application No. 60/872,351, filed on Nov. 30, 2006.

(51) Int. Cl.
  *G06Q 30/00* (2012.01)
(52) U.S. Cl.
  CPC ...................................... *G06Q 30/00* (2013.01)
(58) Field of Classification Search
  CPC .................. A63F 2300/406; A63F 2300/5546; A63F 2300/402; A63F 3/00157; A63F 2300/5573; A63F 2300/302; G06Q 30/0267
  USPC .......................................... 463/39, 40, 42, 43
  See application file for complete search history.

(56) References Cited

U.S. PATENT DOCUMENTS

| 4,339,798 | A | 7/1982 | Hedges et al. |
| 4,856,787 | A | 8/1989 | Itkis |
| 5,586,937 | A | 12/1996 | Menashe |
| 5,594,491 | A | 1/1997 | Hodge et al. |
| 5,630,757 | A | 5/1997 | Gagin et al. |
| 5,643,086 | A | 7/1997 | Alcorn et al. |
| 5,738,583 | A | 4/1998 | Comas et al. |
| 5,761,416 | A | 6/1998 | Mandal et al. |

(Continued)

FOREIGN PATENT DOCUMENTS

FI WO2008065257 A1 6/2008

OTHER PUBLICATIONS

"Internet Industry Interacting Gambling Code: A Code for Industry Co-Regulation in the Area of Internet Gambling Content Pursuant to the Requirements of the Interactive Gaming Act of 2001". Internet Industry Association. Dec. 2001.
Wirelss Network. Wikipedia. http://en.wikipedia.org/wiki/Wireless_network. Nov. 17, 2008.
"Tracking Cookie." Wikipedia. http://en.wikipedia.org/wiki/Tracking_cookie. May 24, 2009.
Blom et al. "Transmission Power Measurements for Wireless Sensor Nodes and their Relationship to Battery Level." Symposium on Wireless Communication Systems. pp. 342-345, Sep. 7, 2005.
"Wi-Fi Location-Based Services—Design and Deployment Considerations." 2006 Cisco Systems. Accessed Dec. 2008. https://learningnetwork.cisco.com/docs/DOC-3418.
"Location in SIP/IP Core Architecture." Open Mobile Alliance. Sep. 4, 2008. Accessed Dec. 2008. http://www.openmobilealliance.org/technical/release_program/locsip_archive.aspx.

(Continued)

*Primary Examiner* — Paul A D'Agostino
*Assistant Examiner* — Brandon Gray
(74) *Attorney, Agent, or Firm* — Kerr IP Group, LLC; Michael A. Kerr

(57) ABSTRACT

A system and method for generating a mobile autonomous dynamic graphical user interface is described. An illustrative system comprises a location-capable component, a user preference module, a server, a means for generating a display menu, and a wireless formatting engine. The location-capable component determines a location for a wireless device. The user preference module includes a variety of user preferences. The server selects targeted content based on the user preferences and the location of the wireless device. The selected content includes at least one user selectable menu button. A display menu is generated that includes the user selectable button. The wireless formatting engine formats the display menu and selected content for the wireless device.

20 Claims, 15 Drawing Sheets

(56) References Cited

U.S. PATENT DOCUMENTS

| | | |
|---|---|---|
| 5,761,647 A | 6/1998 | Boushy |
| 5,762,552 A | 6/1998 | Vuong et al. |
| 5,768,382 A | 6/1998 | Schneier et al. |
| 5,779,545 A | 7/1998 | Berg et al. |
| 5,800,268 A | 9/1998 | Molnick |
| 5,851,149 A | 12/1998 | Xidos et al. |
| 5,871,398 A | 2/1999 | Schneier et al. |
| 5,902,983 A | 5/1999 | Crevelt et al. |
| 5,947,821 A | 9/1999 | Stone |
| 5,971,849 A | 10/1999 | Falciglia |
| 6,001,016 A | 12/1999 | Walker et al. |
| 6,010,404 A | 1/2000 | Walker et al. |
| 6,106,396 A | 8/2000 | Alcorn et al. |
| 6,142,876 A | 11/2000 | Cumbers |
| 6,159,095 A | 12/2000 | Frohm et al. |
| 6,178,510 B1 | 1/2001 | O'Connor et al. |
| 6,203,428 B1 | 3/2001 | Giobbi et al. |
| 6,259,405 B1 | 7/2001 | Stewart et al. |
| 6,322,446 B1 | 11/2001 | Yacenda |
| 6,327,535 B1 | 12/2001 | Evans et al. |
| 6,409,602 B1 | 6/2002 | Wiltshire et al. |
| 6,500,068 B2 | 12/2002 | Walker et al. |
| 6,508,709 B1 | 1/2003 | Karmarkar |
| 6,508,710 B1 | 1/2003 | Paravia et al. |
| 6,527,638 B1 | 3/2003 | Walker et al. |
| 6,554,705 B1 | 4/2003 | Cumbers |
| 6,575,834 B1 | 6/2003 | Lindo |
| 6,606,494 B1 | 8/2003 | Arpee et al. |
| 6,612,928 B1 | 9/2003 | Bradford et al. |
| 6,628,939 B2 | 9/2003 | Paulsen |
| 6,638,170 B1 | 10/2003 | Crumby |
| 6,640,218 B1 | 10/2003 | Golding et al. |
| 6,676,522 B2 | 1/2004 | Rowe |
| 6,682,421 B1 | 1/2004 | Rowe et al. |
| 6,702,672 B1 | 3/2004 | Angell et al. |
| 6,709,333 B1 | 3/2004 | Bradford et al. |
| 6,709,631 B2 | 3/2004 | Mori et al. |
| 6,719,631 B1 | 4/2004 | Tulley et al. |
| 6,749,512 B2 | 6/2004 | MacGregor et al. |
| 6,782,253 B1 | 8/2004 | Shteyn et al. |
| 6,834,195 B2 | 12/2004 | Brandenberg et al. |
| 6,875,110 B1 | 4/2005 | Crumby |
| 6,879,838 B2 | 4/2005 | Rankin et al. |
| 6,884,162 B2 | 4/2005 | Raverdy et al. |
| 6,942,574 B1 | 9/2005 | LeMay et al. |
| 7,035,651 B2 | 4/2006 | Schreiner et al. |
| 7,076,243 B2 | 7/2006 | Parupudi et al. |
| 7,107,245 B1 | 9/2006 | Kowalick |
| 7,136,915 B2 | 11/2006 | Rieger, III |
| 7,196,662 B2 | 3/2007 | Misikangas et al. |
| 7,209,752 B2 | 4/2007 | Myllymaki et al. |
| 7,213,048 B1 | 5/2007 | Parupudi et al. |
| 7,218,941 B1 | 5/2007 | Kubo et al. |
| 7,228,136 B2 | 6/2007 | Myllymaki et al. |
| 7,299,059 B2 | 11/2007 | Misikangas et al. |
| 7,338,372 B2 | 3/2008 | Morrow et al. |
| 7,341,522 B2 | 3/2008 | Yamagishi |
| 7,349,683 B2 | 3/2008 | Misikangas et al. |
| 7,359,714 B2 | 4/2008 | Parupudi et al. |
| 7,397,424 B2 | 7/2008 | Houri |
| 7,450,954 B2 | 11/2008 | Randall |
| 7,493,565 B2 | 2/2009 | Parupudi et al. |
| 7,529,639 B2 | 5/2009 | Rasanen et al. |
| 7,534,169 B2 | 5/2009 | Amaitis et al. |
| 7,611,407 B1 | 11/2009 | Itkis et al. |
| 7,753,772 B1 | 7/2010 | Walker et al. |
| 8,002,617 B1 | 8/2011 | Uskela et al. |
| 8,029,349 B2 | 10/2011 | Lind |
| 8,172,684 B2 | 5/2012 | Adiraju et al. |
| 8,403,755 B2 | 3/2013 | Kerr |
| 8,492,995 B2 | 7/2013 | Maxik et al. |
| 8,506,406 B2 | 8/2013 | Kerr |
| 8,506,407 B2 | 8/2013 | Kerr |
| 8,523,679 B2 | 9/2013 | Kerr |
| 8,738,024 B1 | 5/2014 | Kerr et al. |
| 8,747,229 B2 | 6/2014 | Kerr |
| 8,942,995 B1 | 1/2015 | Kerr |
| 9,043,222 B1 | 5/2015 | Kerr et al. |
| 2001/0004768 A1 | 6/2001 | Hodge et al. |
| 2001/0005908 A1 | 6/2001 | Hodge et al. |
| 2001/0036224 A1 | 11/2001 | Demello et al. |
| 2001/0039210 A1* | 11/2001 | St-Denis ................ 463/42 |
| 2001/0044337 A1 | 11/2001 | Rowe et al. |
| 2002/0002073 A1 | 1/2002 | Montgomery et al. |
| 2002/0007494 A1 | 1/2002 | Hodge |
| 2002/0056125 A1 | 5/2002 | Hodge et al. |
| 2002/0056143 A1 | 5/2002 | Hodge et al. |
| 2002/0069105 A1 | 6/2002 | Botelho et al. |
| 2002/0077130 A1 | 6/2002 | Owensby |
| 2002/0077167 A1 | 6/2002 | Merari |
| 2002/0091568 A1 | 7/2002 | Kraft et al. |
| 2002/0103028 A1 | 8/2002 | Carter et al. |
| 2002/0111210 A1 | 8/2002 | Luciano et al. |
| 2002/0111907 A1 | 8/2002 | Ling |
| 2002/0133707 A1 | 9/2002 | Newcombe |
| 2002/0142815 A1 | 10/2002 | Candelore |
| 2002/0142844 A1 | 10/2002 | Kerr |
| 2002/0142846 A1 | 10/2002 | Paulsen |
| 2002/0144151 A1 | 10/2002 | Shell et al. |
| 2002/0174436 A1 | 11/2002 | Wu et al. |
| 2002/0198775 A1 | 12/2002 | Ryan |
| 2003/0009385 A1 | 1/2003 | Tucciarone et al. |
| 2003/0030666 A1 | 2/2003 | Najmi et al. |
| 2003/0032409 A1 | 2/2003 | Hutcheson et al. |
| 2003/0064805 A1 | 4/2003 | Wells |
| 2003/0119578 A1 | 6/2003 | Newson |
| 2003/0144017 A1 | 7/2003 | Inselberg |
| 2004/0023721 A1 | 2/2004 | Giobbi |
| 2004/0192438 A1 | 9/2004 | Wells et al. |
| 2004/0224757 A1 | 11/2004 | Yamamura et al. |
| 2005/0046608 A1 | 3/2005 | Schantz et al. |
| 2005/0048990 A1 | 3/2005 | Lauriol |
| 2005/0085257 A1 | 4/2005 | Laird et al. |
| 2005/0114212 A1 | 5/2005 | Carrez et al. |
| 2005/0136949 A1 | 6/2005 | Barnes |
| 2005/0154646 A1 | 7/2005 | Chermesino |
| 2005/0159883 A1 | 7/2005 | Humphries et al. |
| 2005/0181804 A1 | 8/2005 | Misikangas et al. |
| 2005/0246334 A1 | 11/2005 | Tao et al. |
| 2005/0261063 A1 | 11/2005 | Boyd et al. |
| 2006/0003830 A1 | 1/2006 | Walker et al. |
| 2006/0004627 A1* | 1/2006 | Baluja ................ 705/14 |
| 2006/0058102 A1 | 3/2006 | Nguyen et al. |
| 2006/0063575 A1 | 3/2006 | Gatto et al. |
| 2006/0125693 A1 | 6/2006 | Recker |
| 2006/0181411 A1 | 8/2006 | Fast et al. |
| 2006/0189382 A1 | 8/2006 | Muir et al. |
| 2006/0194633 A1 | 8/2006 | Paulsen |
| 2006/0238382 A1 | 10/2006 | Kimchi et al. |
| 2006/0240891 A1* | 10/2006 | Klinkhammer et al. ........ 463/25 |
| 2006/0287810 A1 | 12/2006 | Sadri et al. |
| 2007/0024580 A1 | 2/2007 | Sands et al. |
| 2007/0025265 A1 | 2/2007 | Porras et al. |
| 2007/0060306 A1 | 3/2007 | Amaitis et al. |
| 2007/0061229 A1 | 3/2007 | Ramer et al. |
| 2007/0087834 A1 | 4/2007 | Moser et al. |
| 2007/0100963 A1 | 5/2007 | Ban et al. |
| 2007/0136132 A1 | 6/2007 | Weiser et al. |
| 2007/0149215 A1 | 6/2007 | Misikangas |
| 2007/0149216 A1 | 6/2007 | Misikangas |
| 2007/0167210 A1 | 7/2007 | Kelly et al. |
| 2007/0168127 A1 | 7/2007 | Zaruba et al. |
| 2007/0184852 A1 | 8/2007 | Johnson et al. |
| 2007/0218975 A1 | 9/2007 | Iddings et al. |
| 2007/0243925 A1 | 10/2007 | LeMay et al. |
| 2007/0244633 A1 | 10/2007 | Phillips et al. |
| 2007/0257831 A1 | 11/2007 | Mathews et al. |
| 2007/0270212 A1 | 11/2007 | Cockerille et al. |
| 2007/0281692 A1 | 12/2007 | Bucher et al. |
| 2008/0026844 A1 | 1/2008 | Wells |
| 2008/0032705 A1 | 2/2008 | Patel et al. |
| 2008/0039192 A1 | 2/2008 | Laut |
| 2008/0057894 A1 | 3/2008 | Aleksic et al. |
| 2008/0076572 A1* | 3/2008 | Nguyen et al. ................ 463/42 |

(56) References Cited

U.S. PATENT DOCUMENTS

| | | |
|---|---|---|
| 2008/0085692 A1 | 4/2008 | Hart et al. |
| 2008/0096659 A1 | 4/2008 | Kreloff et al. |
| 2008/0097858 A1 | 4/2008 | Vucina et al. |
| 2008/0102947 A1 | 5/2008 | Hays et al. |
| 2008/0108430 A1 | 5/2008 | Evans |
| 2008/0113785 A1 | 5/2008 | Alderucci et al. |
| 2008/0153515 A1 | 6/2008 | Mock et al. |
| 2008/0162037 A1 | 7/2008 | Hasan |
| 2008/0166973 A1 | 7/2008 | Hart et al. |
| 2008/0167106 A1 | 7/2008 | Lutnick et al. |
| 2008/0186234 A1 | 8/2008 | Alles et al. |
| 2008/0189360 A1 | 8/2008 | Kiley et al. |
| 2008/0207296 A1 | 8/2008 | Lutnick et al. |
| 2008/0227473 A1 | 9/2008 | Haney |
| 2008/0249833 A1 | 10/2008 | Ali et al. |
| 2008/0252527 A1 | 10/2008 | Garcia |
| 2008/0281668 A1 | 11/2008 | Nurminen |
| 2009/0197684 A1 | 8/2009 | Arezina et al. |
| 2009/0213771 A1 | 8/2009 | Celentano et al. |
| 2010/0022308 A1 | 1/2010 | Hartmann et al. |
| 2010/0027521 A1 | 2/2010 | Huber et al. |
| 2010/0039929 A1 | 2/2010 | Cho et al. |
| 2010/0048242 A1 | 2/2010 | Rhoads et al. |
| 2010/0063854 A1 | 3/2010 | Purvis et al. |
| 2010/0121567 A1 | 5/2010 | Mendelson |
| 2010/0167771 A1 | 7/2010 | Raghothaman et al. |
| 2010/0287033 A1 | 11/2010 | Mathur |
| 2010/0302056 A1 | 12/2010 | Dutton et al. |
| 2010/0305855 A1 | 12/2010 | Dutton et al. |
| 2010/0331016 A1 | 12/2010 | Dutton et al. |
| 2011/0078167 A1 | 3/2011 | Sundaresan et al. |
| 2011/0103360 A1 | 5/2011 | Ku et al. |
| 2012/0115512 A1 | 5/2012 | Grainger et al. |
| 2012/0122476 A1 | 5/2012 | Lee et al. |
| 2013/0003572 A1 | 1/2013 | Kim et al. |

OTHER PUBLICATIONS

Want et al. "The Active Badge Location System." ACM Transactions on Office Information Systems (TOIS) vol. 10. No. 1, pp. 91-102, Jan. 1992.

Youssef et al. "Location-Clustering Techniques for WLAN Location Determination Systems." 2006. http://wrc.ejust.edu.eg/papers/ijca.pdf.

Vegni et al. "Local Positioning Services on IEEE 802.11 Networks." Radio Engineering, pp. 42-47, vol. 17, No. 2, Jun. 2008.

Ladd et al. "On the Feasibility of Using Wireless Ethernet for Indoor Localization." IEEE Transactions on Robotics and Automation, pp. 555-559, vol. 20, Issue 3, No. 3, Jun. 2004.

Ladd et al. "Using Wireless Ethernet for Localization." IEEE/RJS International Conference on Intelligent Robots and Systems. 2002.

Kitasuka et al. "Positioning Technique of Wireless LAN Terminal Using RSSI between Terminals". Jun. 2005. Accessed Dec. 2008. http://www.techrepublic.com/whitepapers/positioning-technique-of-wireless-lan-terminals-using-rssi-between-terminals/330959.

Lafargue, Edouard. "Wireless Network Audits using Open Source Tools". SANS Institute 2003. Accessed Dec. 2008. http://www.sans.org/reading_room/whitepapers/auditing/wireless-network-audits-open-source-tools_1235.

Heidari, Mohannad. "A Testbed for Real-Time Performance Evaluation of RSS-Based Indoor Geolocation Systems in a Laboratory Environment". Apr. 21, 2005. Accessed Dec. 2008. https://www.wpi.edu/Pubs/ETD/Available/etd-050407-112549/unrestricted/massad.pdf.

Li et al. "A New Method for Yielding a Database of Location Fingerprints in WLAN" IEE Communications Proceedings, pp. 580-586, vol. 152, Issue 5, Oct. 7, 2005.

Sakata et al. "An efficient algorithm for Kriging approximation and optimization with large-scale sampling data". Computer Methods in Applied Mechanics and Engineering. vol. 193, Issues 3-5, pp. 385-404, Jan. 23, 2004.

Muthukrishnan, et al. "Sensing motion using spectral and spatial analysis of WLAN RSSI." Proceedings of the 2nd European conference on Smart sensing and context. 2007. pp. 62-76.

Capkun et al. "Mobility Helps Peer-to-Peer Security." IEEE Transactions on Mobile Computing. vol. 5, Issue 1, pp. 43-51, Jan. 2006.

Milojicic et al. "Peer-to-Peer Computing" Jul. 10, 2002. https://www.hpl.hp.com/techreports/2002/HPL-2002-57R1.pdf.

"The New Normal of Retailing: The Rise of the Mobile Shopper." Next Generation Retail Summit. 2010. http://www.ngrsummit.com/media/whitepapers/Microsoft_NGRUS.pdf.

Lamarca et al. "Place Lab: Positioning Using Radio Beacons in the Wild." Pervasive 2005, LNCS 3468, pp. 116-133, 2005.

Borriello et al. "Delivering Real-World Ubiquitous Location Systems." Communications of the ACM. pp. 36-41, vol. 48, Issue 3, Mar. 2005.

Schilit et al. "Challenge: Ubiquitous Location-Aware Computing and the "Place Lab" Initiative." WMASH Proceedings of the 1st ACM International Workshop on Wireless Mobile Applications and Services on WLAN Hotspots. 2003.

Hightower et al. "Practical Lessons from the Place Lab." IEEE Pervasive Computing. pp. 32-39, vol. 5, Issue 3, Jul.-Sep. 2006.

Hile et al. "Indoor Location Estimation with Placelab." http://www.cs.washington.edu/education/courses/cse590gb/04wi/projects/hile-liu/. Jan. 8, 2004. Accessed on Sep. 25, 2008.

Kang "Extracting Places from Traces of Locations." ACM SIGMOBILE Mobile Computing and Communications Review. vol. 9, Issue 3, Jul. 2005.

Lamarca et al. "Self-Mapping in 802.11 Location Systems." UbiComp 2005: Ubiquitous Computing Lecture Notes in Computer Science, 2005, vol. 3660/2005, 903, DOI: 10.1007111551201_6.

Otsason et al. "Accurate GSM Indoor Localization." Ubiquitous Computing 2005, LNCS 3660, pp. 141-158, 2005.

Chen et al. "Practical Metropolitan-Scale Positioning for GSM Phone." UbiComp 2006: Ubiquitous Computing Lecture Notes in Computer Science, 2006, vol. 4206/2006, pp. 225-242.

Varshavsky et al. "Are GSM Phones THE Solution for Localization?" 7th IEEE Workshop on Mobile Computing Systems and Applications, 2006. pp. 34-42, Aug. 1, 2005.

Chawathe et al. "A Case Study in Building Layered DHT Applications." Proceedings of the 2005 conference on Applications, technologies, architectures, and protocols for computer communications. vol. 35, Issue 4, Oct. 2005.

Lamarca et al. "Finding Yourself: Experimental location technology relies on Wi-Fi and cellphone signals instead of orbiting satellites." Dec. 2004. http://spectrum.ieee.org/computing/networks/finding-yourself.

Letchner et al. "Large-Scale Localization from Wireless Signal Strength." In Proceedings of the National Conference on Artificial Intelligence (AAAI), 2005.

Welbourne et al. "Mobile Context Inference Using Low-Cost Sensors." Location and Context-Awareness Lecture Notes in Computer Science, 2005, vol. 3479/2005, pp. 95-127.

Balakrishnan et al. "Lessons from Developing and Deploying the Cricket Indoor Location System." Nov. 7, 2003. http://www.sds.lcs.mitedu/projects/cricket/V1Exp.pdf.

Cheng et al. "Accuracy Characterization for Metropolitan-scale Wi-Fi Localization." Proceedings of the 3rd international conference on Mobile systems, applications, and services. 2005.

"Ekahau Positioning Engine 4.2." 2008. http://www.nowire.se/images/produktblad/ekahau/datasheet_epe_42_en_11022008_lo.pdf. Sep. 29, 2008.

USPTO, Notice of Allowance of U.S. Appl. No. 12/413,547, Jun. 3, 2014, p. 2.

"Internet Industry Interacting Gambling Code: A Code for Industry Co-Regulation in the Area of Internet Gambling Content Pursuant to the Requirements of the Interactive Gaming Act of 2001". Internet Industry Association. Dec. 2001. cited by applicant.

"Wireless Network." Wikipedia. http://en.wikipedia.org/wiki/Wireless.sub.--network. Nov. 17, 2008. cited by applicant.

HTTP Cookie, redirected from tracking cookie as downloaded from wikipedia, 41 pages.

Wireless Network as downloaded from wikipedia.com, pages. 5 pages.

\* cited by examiner

Username: Mick65
Location: Carson City, Nevada
Time: 2:30 PM 3/3/2007

850 ⟶

852

User Information

Data: Male. Married. 1965. Born in Guayaquil, Ecuador. Grew up Dhahran. Boy 1, DOB 2000. Boy 2, DOB 2003. Kids games. Snowboard. Tennis. Hawaii. Gifts: wife, kids, mom Group Identity: Wannabe Weekend Warrior.

Share Identity: Wife, Mom, Sister, Aunt, Cousin 2, Friend 1, same identity from Ecuador, Dhahran.

854 ⟶

| Opt-In Preferences | | |
|---|---|---|
| Merchants | Search | Loyalty Points |
| Merchant 0028 | Sport Chalet | 1200 |
| Merchant 0866 | Ski Outfitter | 500 |
| Merchant 0044 | Skating Rink | 300 |
| Food – Italian, Asian, South of the Border | | |

Opt-In Radius — 856
○ 10 feet
○ 100 feet
○ 0.25 mile
○ 1 mile
○ 2 mile
● 5 mile

858 ⟶

Privacy Setting
○ Anonymous (always)      ○ Anonymous (locally)
○ Anonymous (except for preferred merchants)      ● Anonymous (except for Opt-In Preferences)

860 ⟶

Communication Device
● Mobile      ○ Set-Top Box      ● PC1      ○ PC2

Max Ads — 862
5 ads/day
30 ads/wk
30 ads/mo

864 ⟶

| Opt-Out Preferences |
|---|
| Complete Opt-Out: Merchant 107, Merchant 1258, Store 12, Services 358 |
| Partial Opt-Out: Merchant 001 (accept Daily Soup Only); Merchant 022 (accept Sweaters Only). |
| Content: NO Fast Food; NO Car Commercial; NO Computer; NO Legal Services; NO Medical Services |
| Valid for: 29 days |

Save Ads — 866
● Yes
○ No
For 3 wks

Figure 14

SYSTEM AND METHOD FOR RECEIVING TARGETED CONTENT ON A PORTABLE ELECTRONIC DEVICE

CROSS REFERENCES TO RELATED APPLICATIONS

This patent application is a continuation of U.S. patent application Ser. No. 12/413,547, filed Mar. 28, 2009 now U.S. Pat. No. 8,942,995, which claims priority to Provisional Application No. 61/040,661, filed Mar. 29, 2008; and is a continuation-in-part of non-provisional application Ser. No. 11/948,007, titled PLAYER TRACKING USING A WIRELESS DEVICE FOR A CASINO PROPERTY filed on Nov. 30, 2007, which is related to provisional application 60/872,351, filed Nov. 30, 2006; all of which are hereby incorporated by reference.

FIELD OF THE INVENTION

This invention relates to a mobile autonomous dynamic graphical user-interface (GUI). More particularly, the invention relates to a system and method for generating a mobile autonomous dynamic GUI based on location and user preferences.

BACKGROUND

The advertising of goods and services has undergone historical changes that are reflected by intertwining technology and trademark law. In pre-historic communities the quality of goods and services was associated with a "mark" that represented the individual, family, tribe, or group of artisans that produced the goods. In particular, "marks" were applied to bricks, pottery and roof tiles circa 3000 BC.

Between the $12^{th}$ and $14^{th}$ centuries, trade guilds began using trademarks, and the English law on trademarks, i.e. Bakers Marking Law, became black letter law. During this period statutes were passed that enabled merchants whose goods had been pirated to provide evidence of ownership using marks appearing on the goods.

As printing developed in the $15^{th}$ and $16^{th}$ centuries, advertising expanded from the reliance on trademarks to include handbills, and in the $17^{th}$ century, advertisements started to appear in weekly newspapers in England. These early print ads were mainly to promote books and newspapers in England, which had become increasingly affordable due to the invention of the printing press.

Regretfully, the advent of the printing press also brought with it false advertising, especially as it related to drugs. To combat this influx of false advertising, there was a reliance on marks or trademarks that authenticated that the goods received were produced by a reputable manufacturer.

In the $20^{th}$ century, advertising continued to change with the advent of the radio and television, which resulted in sponsorship by one or more businesses for radio or television content. In the late 80's and 90's the success of cable television with a number of different channels that catered to particular demographic segments provided a new media source for targeted advertising. Generally, the cost of television and radio advertising is relatively high and this creates a relatively high barrier to entry. Therefore, those businesses that elect to use TV and radio for advertising are established companies that have invested money in developing a brand or a reputation, which results in a recognizable trademark.

In the $21^{st}$ century, the popularity of the Internet has produced a new media outlet for advertising. Currently, the Internet supports advertising on the World Wide Web and advertising using e-mail. Unlike television or radio advertising, Internet-based advertising does not have the same barriers to entry, so an individual with a credit card and $5 can begin a Web based advertising campaign, and an individual with a list of valid e-mail addresses can begin an e-mail advertising campaign.

As a result, we currently live in an age of unsolicited e-mail, i.e. spam, and web-based search solutions that overwhelm the user with information. To simply control unsolicited e-mail, an individual uses "spam" filters to remove the unsolicited e-mail. Even with spam filters, unsolicited e-mail still finds its way to the user.

And as it relates to the use of the web-based search engines, an individual has to interact with a personal computer and sift through the information before finding information that is pertinent to their search. Advertising on a web-based search engine is dependent on the "relevance" of the surrounding web content and the traffic that a particular website receives, and the individual is overwhelmed with information. Although search engines and browsers are capable of storing the individuals search history and commonly accessed URLs, these search tools simply add to the information glut.

Thus, there is a need for receiving desirable advertising that overcomes the limitations of spam. Additionally, there is a need for receiving simplified web-based search results. Additionally, the Internet provides such a low barrier to entry for advertising that there is a substantial amount of false advertising. Thus, there is also a need to minimize false advertising on the Internet.

Furthermore, the growing popularity of mobile handsets that are Internet enabled has further exacerbated some of the problems that were associated with a user's PC. For example, the search process on a mobile handset is limited by the screen size of the mobile handset, so that the information glut experience of a PC desktop simply cannot be supported on the mobile handset. Additionally, the reading of unsolicited e-mail on a mobile handset comes at a substantial price because the user is charged for the number of "minutes" used or the amount of data that is downloaded.

Thus, there is a need to overcome the limitations associated with the mobile search process and the receiving of unsolicited e-mails or other such content on a mobile handset. Further still, the interface on a mobile handset may not permit a user to simply key in an entry, like the PC keyboard. Therefore, the user is left to hunt and peck for the proper letter or number, severely limiting the user's searching ability. Thus, there is a need for a user to conduct a user-defined search that overcomes individual searching limitations.

Finally, the current state of the art of mobile search must be actively enabled by the user, and the user must actively input search terms or search categories to find desirable information. This process is not trivial because the approach requires interfacing with a small keypad, inputting text or commands into a small screen, waiting for the text or command to be processed by the carrier network, sifting through the carrier generated output on the small screen, selecting the hyperlink of interest, waiting for the network to transmit the information associated with the hyperlink, sifting through the information on the same small screen, determining if the information is desirable, and then beginning the entire search process over again if the information is not desirable. Thus, there is a need for a simplified mobile search process that provides desirable information with minimal user input.

SUMMARY

A system configured to generate a mobile autonomous dynamic graphical user interface (GUI) is described. In one illustrative embodiment, the mobile autonomous dynamic GUI system comprises a wireless device, a location-capable component, a user preference module, an anonymizing network server, at least one third-party server, a means for generating a display menu, and a wireless formatting engine. The wireless device is capable of presenting a GUI to a user. The location-capable component is configured to determine a location for the wireless device. The user preference module is associated with the user and includes a plurality of user preferences. The anonymizing network server is configured to receive the location and the user preferences and to anonymize the location and user preferences before communicating the anonymous user preferences and the anonymous location. The third-party server is configured to receive the anonymous location and the anonymous user preferences and select targeted content based on the anonymous user preferences and the anonymous location, wherein the selected content includes at least one user-selectable menu button. The means for generating a display menu that is served to the wireless device includes the user selectable menu button. The wireless formatting engine receives the display menu and the selected content and formats the display menu and selected content for the wireless device.

In another illustrative embodiment, the mobile autonomous dynamic GUI comprises a wireless device, a location-capable component, a user preference module, an integrated network server, a means for generating a display menu and a wireless formatting engine. The wireless device is capable of presenting a GUI to a user. The location-capable component is configured to determine a location for the wireless device. The user preference module is associated with the user and includes a plurality of user preferences. The integrated network server is configured to receive the location for the wireless device and the user preferences. Additionally, the integrated network server is configured to select targeted content based on the location and the user preferences, wherein the selected content includes at least one user selectable menu button. The means for generating a display menu that is served to the wireless device includes the user selectable menu button. The wireless formatting engine receives the display menu and the selected content and formats the display menu and selected content for the wireless device.

A method for generating the mobile autonomous dynamic graphical user interface is described. The method comprises determining a location for a wireless device with a location-capable component. The method then proceeds to determine a plurality of user preferences with a user preference module that is associated with the user. The location and the user preferences are received at a network server and the location and user preferences are communicated to a content server. The content server selects targeted content based on the location and the user preferences and the selected content includes at least one menu button. A display menu is generated that is served to the wireless device. The display menu includes the user selectable menu button. The method then proceeds to format the display menu and the selected content for displaying on the wireless device.

DRAWINGS

The present invention will be more fully understood by reference to the following drawings which are for illustrative, not limiting, purposes.

FIG. 14 shows an illustrative GUI that a user interacts with to generate a comprehensive user preference profile.

DETAILED DESCRIPTION

Figure 1:
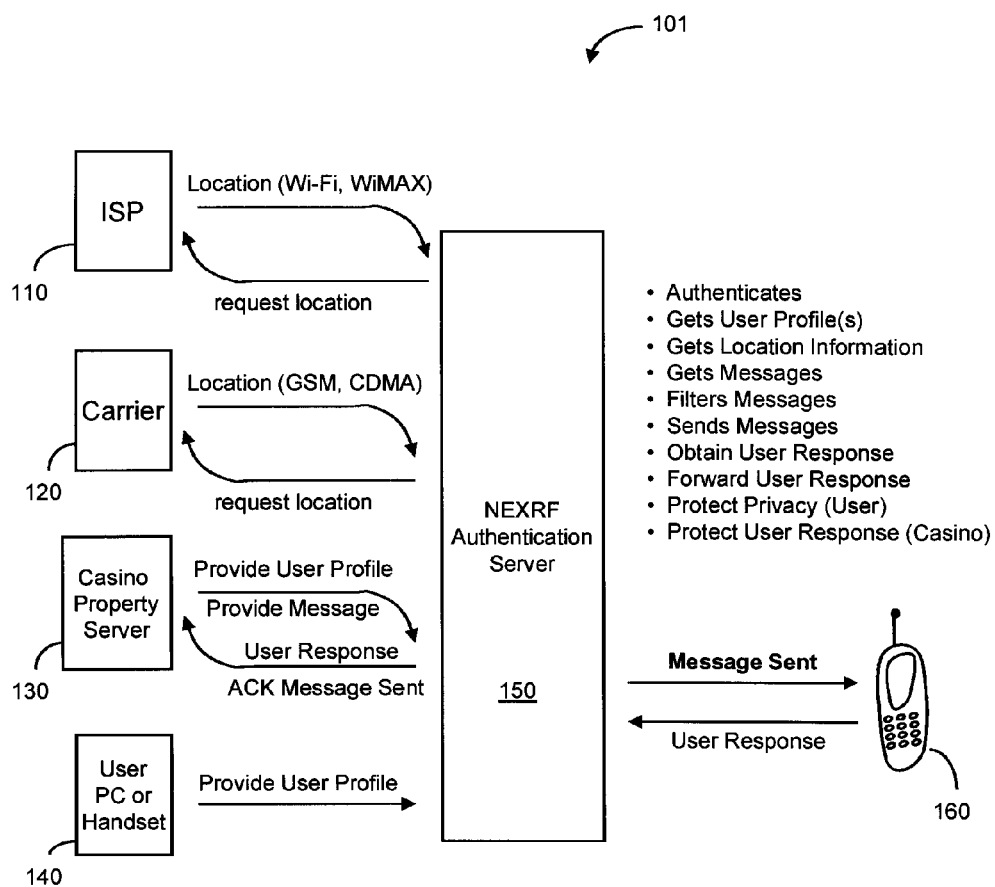
FIG. 1 shows a simplified client-server system that can be used to generate highly targeted and desirable advertising, to provide dynamic menus that support location based ordering, and to support converting the mobile handset into a transactional device that can be used to pay for the ordered goods or services.

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the systems and apparatus described hereinafter may vary as to configuration and as to details. Additionally, the method may vary as to details, order of the actions, or other variations without departing from the illustrative method disclosed herein.

The systems and method described herein communicate targeted content as a function of the user preference profile, user location, and time. The targeted content includes but is not limited to a list of links or hyperlinks, display menus, location-based-ordering menus, advertisements, targeted advertisements, games, video, audio, and other such content.

The user preference profile includes a plurality of user preferences such as dining preferences, entertainment preferences, drink preferences, and other such preferences as described herein.

In general, the systems and methods described herein enable highly targeted and desirable advertising to be communicated to a user by generating dynamic menus with hyperlinks, supporting location based ordering, and converting the mobile handset into a transactional device that can be used to pay for the ordered goods or services.

More particularly, the systems and methods described herein support a mobile autonomous dynamic graphical user interface (MADGUI). With respect to a wireless device, the MADGUI enables the wireless display to present a dynamic portal that changes independent of the additional user input. Thus, the MADGUI can change even with little or no direct input from the user. Instead, the change to the MADGUI is triggered by changes to the user location, the user preference profile, the time, or any combination thereof.

In one of the illustrative embodiments, a mobile handset or wireless device embodiment performs the MADGUI operations within a casino property. For the casino property embodiment, the wireless device also supports gaming activities and may be converted into a secure gaming device as described in the patent application entitled BIOMETRIC BROADBAND GAMING SYSTEM AND METHOD and its progeny, which are hereby incorporated by reference.

The goal of a casino property is to keep players on the property and to get players that are off the property back on the property. Thus, a player tracking implementation is described below that may also be used to support wireless gaming applications such as a sports book, horse racing, bingo, slots, table games, and other such games.

The illustrative wireless communication device described herein may be a mobile handset, mobile phone, wireless phone, portable cell phone, cellular phone, portable phone, a personal digital assistant (PDA), or any type of mobile terminal which is regularly carried by a user and has all the elements necessary for operation in a wireless communication system. The wireless communications include, by way of example and not of limitation, CDMA, WCDMA, GSM or UMTS or any other wireless communication system such as wireless local area network (WLAN), Wi-Fi or WiMAX. For purposes of this patent, the term wireless communication device, mobile handset, wireless phone, and mobile phone are interchangeable. Additionally, the term wireless communication device may refer to a mobile phone, a mobile Wi-Fi handset, a Wi-Fi device with a display, a WiMAX handset, or any other such communication device.

The minimum requirements for the wireless communication device described herein include a display, a means for interacting with the display, a transceiver that supports wireless communications, and a means for processing instructions communicated to and from the wireless communication device. The wireless communication device is in communication with an antenna that can be associated with an access point, a femtocell, and/or a base station antenna associated with a cellular phone network, and the device may use Wi-Fi or WiMAX, or other such networking protocols.

Referring to FIG. 1 there is shown a simplified client-server system 101 that can be used to generate the MADGUI with a list of desirable links or menu buttons associated with highly targeted and desirable advertising, point of interest information, dynamic menus that support location based ordering. Further, the MADGUI enables the mobile handset to be used as a transactional device conducting transactions associated with the ordered goods or services. The illustrative client-server system 101 is scalable, and supports multiple clients and servers.

In the illustrative embodiment shown in FIG. 1, the location information is collected from an ISP 110 and/or a Carrier 120 using GPS or other such location positioning. In another embodiment, the casino property loans a wireless handset 160 to a player or casino guest, and the casino property provides the location information regarding the wireless communication device 160 to the intermediary server 150 using an indoor positioning technology such as RF fingerprinting. In an alternative embodiment, where the owner of the handset 160 is the casino guest, the casino guest opts-in to provide location information to the intermediary server 150 and downloads the software program that mirrors the operations performed by the casino property's loaned wireless communication device 160.

The illustrative ISP 110 may be a casino property that employs various indoor positioning technologies and provides wireless connectivity using one of a plurality of networking standards such as femtocells, Wi-Fi, WiMAX, RFID, or other such technologies. Wireless positioning technologies include Wi-Fi, Bluetooth, RFID, UWB, ultrasound, cellular networks, angle of arrival, time of arrival, time difference of arrival, received signal strength, multicarrier phase measurement, time transfer, spread spectrum, RF fingerprinting, GPS, GNSS, and other such technologies. A more detailed explanation of various wireless positioning technologies can be found in WIRELESS POSITIONING TECHNOLOGIES AND APPLICATIONS authored by Alan Bensky and published by Artech House, Inc. in 2008.

The illustrative casino ISP 110 is configured to identify the location of the wireless communication device 160 using the illustrative location-based techniques such as RF fingerprinting and RFID tags. Additionally, the illustrative Carrier 120 provides wireless services that comply with the E911 regulations and also generates location information. This location information is served by the casino ISP 110 or Carrier 120 to the intermediary server 150.

A variety of different user preference profiles may be collected from different sources. For simplicity, a first user preference profile is collected from a casino property, and a second user preference profile is collected directly from the user. In the casino-generated user preference profile, the casino may indicate user preferences such as cocktail preferences and dining preferences. The casino user preference profile may comprise monitored betting activity associated with the player and accumulated points stored in a player account according to a monetary value of the monitored betting activity. Complementary goods or services are determined based on the accumulated points associated with the player account, and content may be sent to the wireless communication device associated with the complementary goods or services that are consistent with the user preference profile. The casino user preference profile can also be used as a basis to provide mobile concierge services.

The second user preference profile may be generated separately by a player using a personal computer (PC) 140 and may indicate the users "comp" preferences, where the player may prefer to obtain tickets to a particular Vegas show or to opt-out of receiving comps for a particular dining establishment.

The intermediary server 150 authenticates information that is received from each source and "filters" the received content based on the user preference profile, the user location, and the time. The selected content or "content" includes, but is not limited to, a list of links, display menus, location-basedordering menus, advertisements, targeted advertisements, games, video, audio, and other such content.

The intermediary server 150 gathers the user preference profile information and obtains the location information. Additionally, the intermediary server 150 receives the content, which may have already been filtered as a function of the user preference profile, location, and time. The selected content may have been generated by the illustrative casino property; however, the content may also have been generated by any a third party such as a search entity, social networking company, news outlet, video sharing website, music distributor, gaming company, or other such third party that operates independent of the casino property server systems. The intermediary server 150 then proceeds to "filter" the selected content that is communicated to the wireless communication device 160 based on user preferences, location, time, or any combination thereof.

The intermediary server 150 then waits for a user response. The user response may be positive and the user may wish to proceed with obtaining more information or acknowledging a particular action. The user may also NOT like the selected content and the user response may be an opt-out request that states the selected content is undesirable. Alternatively, the user may provide a "thumbs up" or "thumbs down" feedback. Regardless, the resulting response is sent to the casino server 130. Additionally, the user preference profile resident on the intermediary server 150 is updated based on the user response. In another embodiment, the operations performed by the casino property server 130 and the authentication server 150 are performed on a single server associated with a separate brick-and-mortar merchant such as a retail store within a casino property.

Although there are numerous benefits in the client-server architecture, there are also limitations associated with the client-server architecture that are not overcome by distributed object computing. These limitations include cost, lack of scalability, a single point of failure, administration difficulties, and the inefficient use of network resources. The peer-to-peer (P2P) architecture is intended to address the limitations of the client-server solution, and a migration from the client-server solution to the P2P solution is anticipated. In a peer-to-peer architecture clients are also servers and routers. Additionally, each node contributes content, storage, memory, and processing resources. The network is dynamic and nodes are free to enter and exit the network. The nodes can also collaborate directly with one another. Furthermore, nodes can have varying capabilities.

The goals and benefits of peer-to-peer systems include efficient use of resources so unused bandwidth, storage, and processing power at the edge of the network can be used efficiently. P2P systems are also scalable; because there is no central information, there is no communication and computation bottleneck. The P2P systems are also reliable and provide no single point of failure. There is also an ease of administration because the nodes self-organize and have built-in fault tolerance, replication, and load balancing, resulting in increased autonomy. Since a P2P network is not a centralized system, there a greater degree of anonymity and privacy in a P2P network. Since the P2P environment is highly dynamic, ad-hoc communication and collaboration is supported.

Figure 2:
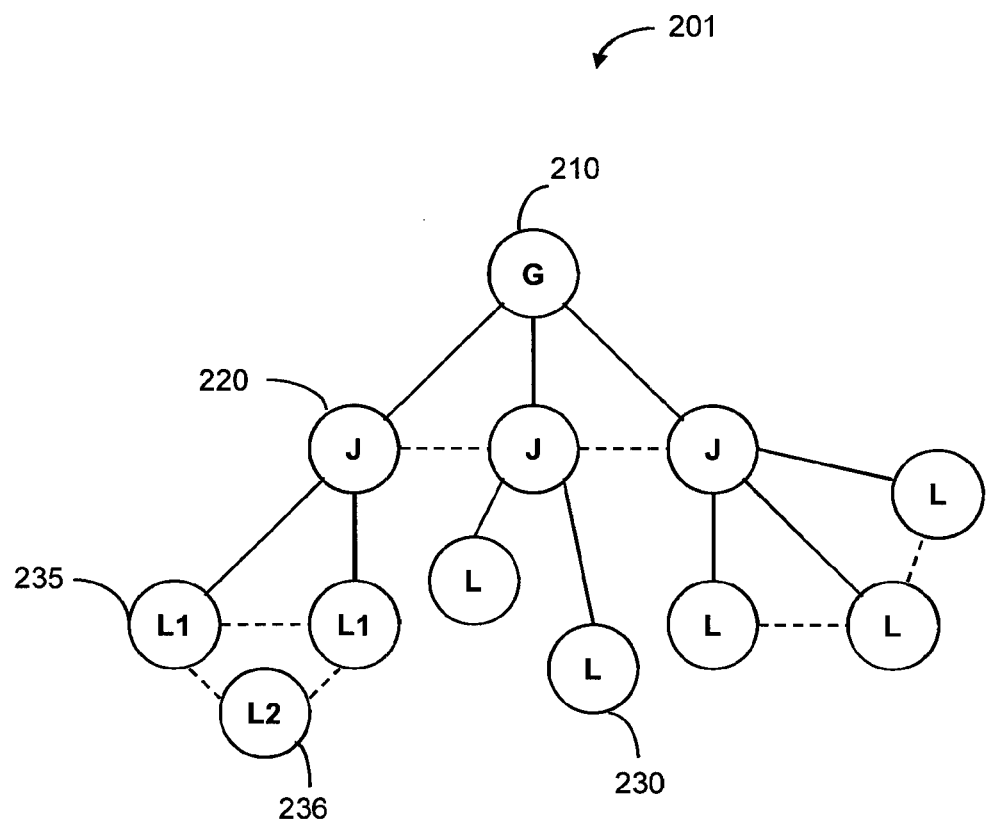
FIG. 2 shows an illustrative hierarchical peer-to-peer system that can be used to generate highly targeted and desirable advertising, to provide dynamic menus that support location based ordering, and to support converting the mobile handset into a transactional device that can be used to pay for the ordered goods or services.

Referring to FIG. 2 there is shown an illustrative hierarchical peer-to-peer system 201 that can be used to generate the MADGUI portal to provide highly targeted and desirable advertising, to serve up dynamic menus that support location based ordering, and to support using the mobile handset as a transactional device that can be used to pay for the ordered goods or services. For the illustrative P2P embodiment, the illustrative embodiment is a hierarchical peer-to-peer network that is comprised of three different types of nodes: Global Node(s) 210, Jurisdictional Node(s) 220, and Local Node(s) 230. There may be different levels or subsets for each type of node, e.g. L1 235 and L2 236 Local Nodes. The hierarchical peer-to-peer network overlay is highly scalable, robust, and secure. The P2P overlay resides on a group of personal computers or servers and leverages resources within an existing network infrastructure.

In this embodiment, the user preference profile including the user preferences and monitored betting activity or "personalization" is performed and controlled by the user's device. The user preference profile is resident on the wireless communication device or personal computer that accesses a Network such as a wide area network (WAN) that may be embodied as the Internet.

The Global Node (G) 210 authenticates each node in the network including the Jurisdictional Node 220 and the L1 235 and L2 236 Local Nodes. Additionally, the Global Node 210 authenticates the user accessing the network. The Global Node 210 provides oversight for the operations performed by each Jurisdictional Node 220. The Global Node 210 also ensures that the files being shared by each node have the stated content. The Global Node 210 combines the user preference profile information received from the L1 235 Local Node, the L2 236 Local Node, and the Jurisdictional nodes 220. In one embodiment where the user's privacy concerns are a high priority, the Global Node 210 performs the operations of an anonymizing proxy, so the user, the user preference profile and the wireless communication device become anonymous. In another embodiment where the systems' security concerns are the highest priority, the Global Node 210 provides oversight for the operations performed by the L1 235 and L2 236 Local Nodes and anonymizing services are NOT performed.

In the illustrative P2P embodiment, the user preference profile is generated from information provided by the user (L1 node 235), and the merchant (L2 node 236). Also, information may be provided from the Jurisdictional Node 220. Additionally, logged user preference profiles from a search engine may be used to contribute to the user preference profile.

The illustrative Global Node 210 may also be configured to assist in facilitating transactions with Jurisdictional Nodes 220 and Local Nodes 230 that contribute to the transaction. Completed Point-of-Sale (POS) transactional information may also be shared.

The Jurisdictional Node 220 (J) controls access to the network. The Jurisdictional Node 220 may be associated with an illustrative Carrier, service provider, merchant, or casino property. The Jurisdictional Node 220 pushes personalized data to the user based on the user's preference profile. The Jurisdictional Node 220 also polices the activities of each Local Node 230 within its network, and if a local node is generating inappropriate content, the infected Local Node(s) 230 having the inappropriate content is blocked by the Jurisdictional Node 220. Additionally, the Jurisdictional Node 220 may have stored or generated user-specific information that it is willing to "share" with the Global Node 210 so that a "better" virtual agent can be generated on behalf of the user.

Jurisdictional Node tools may be licensed to the Carrier and/or service provider. The tools permit the Jurisdictional Node 220 to generate revenue from sharing user preference profile information and from converting the wireless communication device to a Point-of-Sale (POS) device.

The Local Node 230 (L) stores the content. The local nodes either provide or receive location information associated with the wireless communication device. There are two types of local nodes: the L2 Node 236 is a merchant-centric node; and the L1 Node 235 is user-centric.

The L1 Node 235 (user) is associated with the user and may reside on the user's PC and/or the user's wireless communication device. The L1 Node 235 is configured to receive user preference profile information such as dining preferences, banking preferences, shopping preferences, in-merchant preferences, and opt-out preferences. For example, an opt-out preference may be "Block ALL Starbucks Content." Additionally, the L1 Node 235 (user) may receive location information and permit users to communicate location information.

Additionally, the L1 Node 235 (user) may convert the wireless communication device to a Point-of-Sale (POS) device that can use coupons, rebates, and gift cards. The L1 Node 235 (user) is configured to close the transactional loop after receiving targeted content and to complete a transaction associated with the targeted content.

The L2 Node 236 (merchant) may also have user preference profile information that the merchant would like to contribute to generate the localized targeted content, e.g. advertisement or location based ordering menu. The Local Node's merchant content is associated with a particular location. For example, the L2 Node 236 (merchant) may communicate different indoor and outdoor advertising content, so one content is received in a parking lot and different content is received within the merchant's store.

The L2 Node 236 (merchant) software enables the merchant to generate mobile advertisements for handsets and to share the merchant's user preference profile. Additionally, the software enables the merchant to convert the wireless communication device to a POS device is also provided.

Illustrative Casino Player Tracking System

The casino application may reside in either the client-server network architecture or the P2P network architecture. However, because of the degree of control needed over sensitive player information and because of the progression towards server based gaming, the client-server network architecture is likely the preferred near-term architecture.

Player tracking is an important element of a casino property's goal to retain players and build player goodwill. Player tracking information is information related to how a player wagers in a casino property. Based on the player tracking information, the casino determines how to "comp" the player. Comps are complimentary gifts or services that are provided to the player, e.g. gaming credits, redeemable cash, free rooms, room upgrades, tickets to shows, show upgrades, complimentary restaurant meals, etc. Player tracking information is extremely sensitive and proprietary information that a casino property does NOT share with any competitors. Currently, player tracking is used to track "regular players" and usually a regular player is provided with a mag stripe card that the player swipes into a gaming machine or gives to the dealer at a table game.

In a first casino property Embodiment, the Player is Provided with a Mobile handset that is location enabled. For illustrative purposes only, the player is a high roller or preferred player who regularly wagers at the casino property. The handset may be provided by a local casino property so that the handset provides "global" anonymity, the benefit of supporting local casino applications, and an ordering platform similar to the same services provided by an in-room phone. In a second casino property embodiment, the player provides a phone number and allows one or more software applets to be downloaded to his handset. In a third casino embodiment, an application is downloaded to the user's device much like an iPhone downloadable application. In a fourth embodiment, an application is accessed through a mobile web browser.

Casino properties maintain profiles for their preferred players. These profiles are used to create an experience that keeps the player coming back to the property. For the casino property, the user preference profile is provided by the casino property and may be managed by the casino property. The user preference profile for a particular player may include information such as cocktail preferences, dining preferences, entertainment preferences, gaming preferences, and opt-out preferences. The handset can be used to gain VIP admission to clubs and shows, and even room access.

In the illustrative casino property embodiment, the carriers will need to provide location information. In certain instances, such as within a building, GPS information may be more difficult to obtain, and a Wi-Fi or femtocell network may be needed within the casino property, e.g. gaming zones and high roller suites. The Wi-Fi and/or femtocell network may be managed by the property, the Carrier, or an ISP.

To accommodate the user, a handset may be loaned to the user. The type of handsets that are loaned possesses a user interface (UI) that is attractive to the user. However, there may be resistance to using a new handset when the user has invested much time in understanding the existing UI on the user's current handset. Therefore, to accommodate the type of user who does not wish to switch handsets, the handset must be configured to receive one or more software programs, e.g. Java applets, which reside on the handset, and provide the functionality described herein.

For illustrative purposes only, a dual mode handset is selected that includes CDMA, EV-DO and Wi-Fi technology. The handset is location enabled as described herein. For example, it may desirable to send a preferred player targeted content when the player is at the bar telling the preferred player that they qualify for a $500 credit, or that they have "won" a free meal or a suite upgrade. This process may be performed autonomously and triggered by certain predetermined conditions such as location, time at the bar, and historical player activity. The wireless device may also have a large storage component that stores a casino's user-specific information that is triggered based on location and/or user requests.

In an illustrative IPTV application, targeted content can be communicated to a large monitor or display that is viewable by the player such that the targeted content displayed on the monitor is triggered by the casino property's awareness of the user's location, the user's preference profile, and the particular time. In the illustrative IPTV application, the wireless device enables the property to obtain the combination of the user's location, the user's preference profile and the particular time. Thus, a desirable and targeted video content can play after the user has been sitting at the bar. The content may displayed on the wireless handset and/or on the large monitor that is on the IP network. The content may be triggered by satisfying a particular wait time, e.g. after five minutes at the bar, the IPTV displays a sports event consistent with the user preference profile. Alternatively, content may be pre-loaded on the handset such as a brief informational about a nearby activity, e.g. poker tournament.

The handset may also be programmed in English or the player's language of choice, e.g. Japanese, Mandarin, Korean, Arabic, Farsi, etc. The interface may be modified to include concierge information, and point of interest (POI) information. Room service and similar casino services can also be programmed into the handheld device. In the illustrative casino property embodiment, player tracking information is not shared with another casino property and is not used for data mining by the Carrier.

Figure 3:
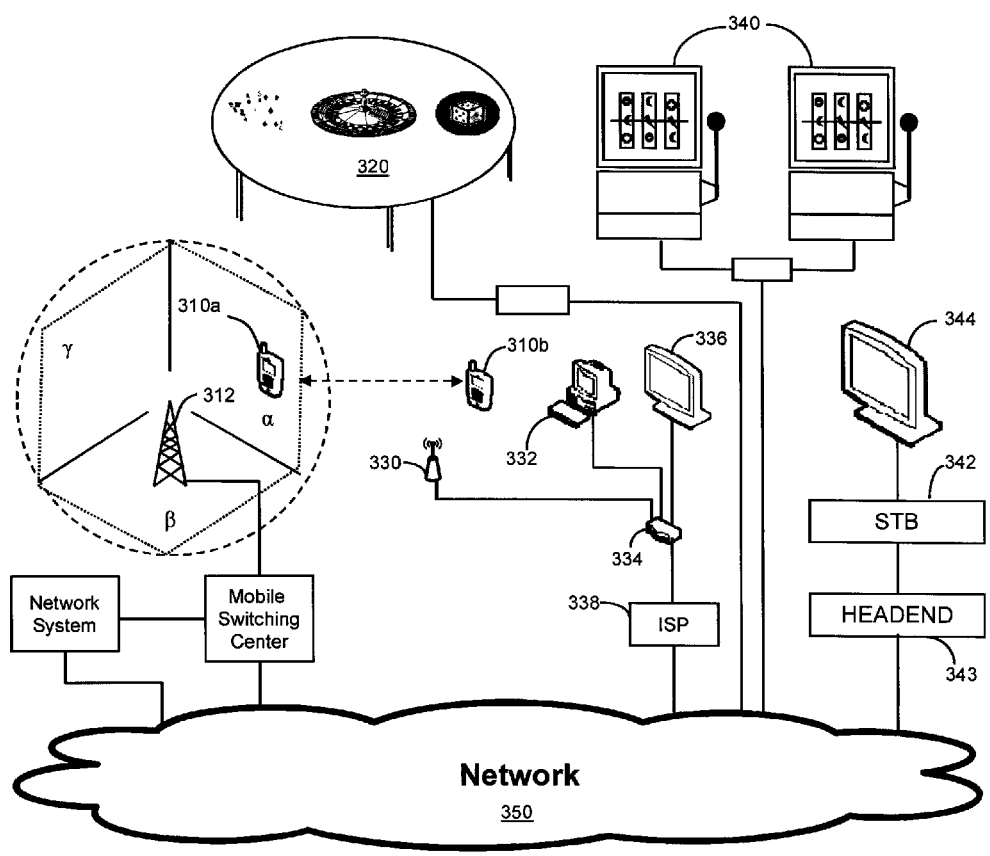
FIG. 3 shows an illustrative group of wireless and wired devices that interface with the systems and methods described herein.

Referring to FIG. 3 there is shown an illustrative group of wireless and wired devices that interface with the systems and methods described herein. The wireless devices include a wireless handset 310a operating on a carrier network 312. Another wireless handset 310b communicates with a wireless access point 330 that is operatively coupled to a router 334. The router 334 is communicatively coupled through an ISP 338 to a Network 350. The illustrative Network 350 may be a metropolitan area network (MAN) or a wide area network (WAN) such as the Internet. The router is also communicatively coupled to a personal computer 332 and an IP addressable display 336. Additionally, a wired gaming table 320 and a plurality of slot machines 340 that are operatively coupled to the Network 350 are also shown. Furthermore, a display 344 that is communicatively to the Network 350 via a set top box 342 and headend system 343 is also shown.

The illustrative IP addressable display 336 can be a large monitor that is configured to receive targeted content as described above. The content can be audiovisual content such as a video stream, an audio stream, or an audio-video stream controlled and managed by an IPTV system. The IPTV system stores audiovisual content and communicates the content to the appropriate display 336 depending on the user's location, user preference profile, and the particular time.

Figure 4:
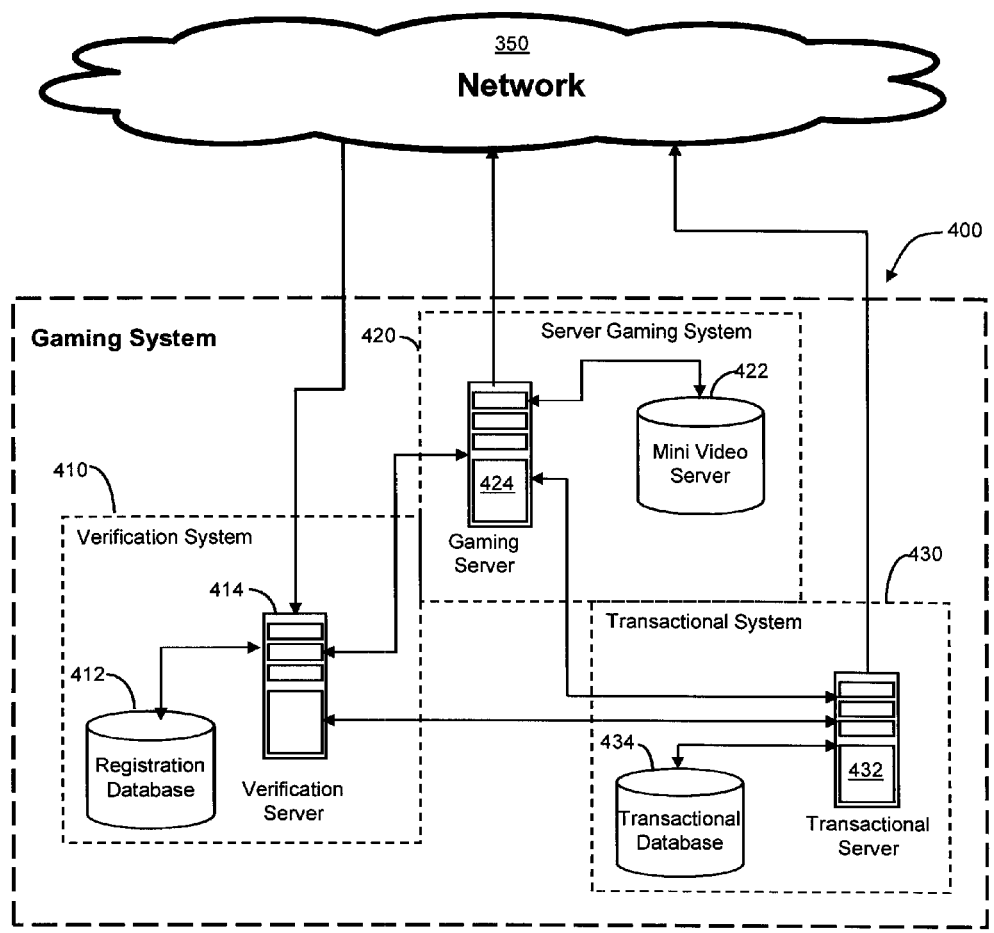
FIG. 4 shows a gaming system configured to interface with the wireless and wired devices described in FIG. 3.

Referring to FIG. 4 there is shown an illustrative gaming system configured to interface with the wireless and wired devices described in FIG. 3. The networked server-based gaming system was previously described in the patent application entitled BIOMETRIC BROADBAND GAMING SYSTEM AND METHOD, which is hereby incorporated by reference.

There is shown a high level block diagram of a gaming system 400 in communication with a plurality of network access devices coupled to Network 350. The gaming system 400 comprises a verification system 410, a server gaming system 420 and a transactional system 430. The verification system 410 verifies that a user operating a network access device is a registered player. The server gaming system 420 performs the function of generating a game and broadcasting the game results to each of the network access devices. The transactional system 430 performs a plurality of functions including tracking each transaction performed by both the verification system and the server gaming system and conducting electronic fund transfers.

Verification System

The verification system 410 verifies that a user desiring to play the game is a registered player. The verification system 410 communicates with a network access device to generate user identification information. The user identification information includes information such as cryptographic keys that are necessary to securely identify the network access device. The user identification information also includes media access control (MAC) identification and confirmation of the user Internet Protocol (IP) address. The user identification information is compared to information in a registration database 412 by a verification server 414. If an acceptable match is made between the user identification information and the information in the registration database, the user is designated as a player. The player then has access to either the server gaming system 420 or the transactional system 430.

In an alternative embodiment the user identification information is housed in a smart card (not shown) that is in communication with the verification system 410. The smart card may include a stored biometric which is used to identify the user as a player. Cryptographic keys are then exchanged between the verification system 410 and the smart card to provide the player access to either the server gaming system 420 or the transactional system 430.

Server Based Gaming System

The server gaming system 420 comprises a mini video server 422 and a gaming server 424 which is in communication with the verification system 410. The server gaming system 420 includes a buffer which stores information about players who desire to play a game. A random number generator generates a random number for each player in the buffer. A paytable module in communication with the random number generator determines the outcome associated with the random number generator. The paytable also determines which images associate with the outcome for each player. Preferably, the images are stored on a mini video server 422 which stores a plurality of images corresponding to a particular game outcome. The system may be designed to operate in a multi-tasking mode where more than one game is played at a time.

Transactional System

The transactional system 430 comprises a transactional server 432 and a transactional database 434. The transactional system 430 performs a plurality of functions including tracking each transaction performed by both the verification system 410 and the server gaming system 420. Additionally, the transactional system 430 is configured to authorize and conduct electronic fund transfers. Furthermore, the transactional system 430 performs such operations as player tracking, managing loyalty programs, engaging bonus games, determining bonus prizes and interfacing with accounting programs. The transactional system 430 is also capable of receiving a plurality of funds from a financial account and converting them to credits that are used in the server gaming system 420.

Figure 5:
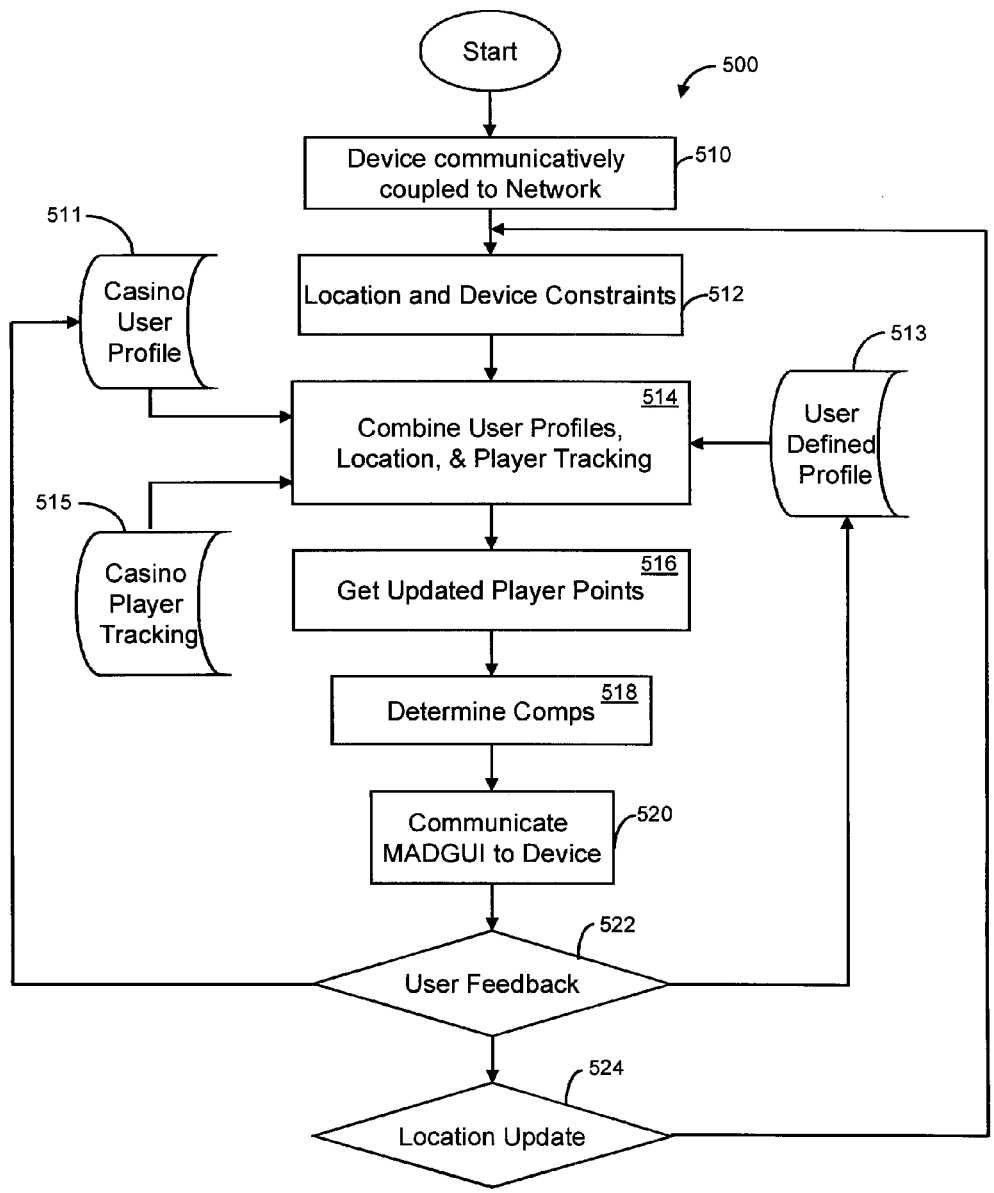
FIG. 5 shows an illustrative flowchart for an illustrative method to generate a mobile autonomous dynamic graphical user interface that is communicated to a wireless handset in a casino property.

Referring to FIG. 5 there is shown an illustrative flowchart for an illustrative method 500 to generate a mobile autonomous dynamic graphical user interface that is communicated to a wireless handset in a casino property. The illustrative wireless device may be a handheld wireless device that can operate using either a traditional carrier network, a Wi-Fi network, or any other such wireless network that communicates with the wireless device. The illustrative wireless device is a touch screen device such as the SIEMENS® SX-66, HTC® TOUCH®, APPLE® iPHONE® or other such touchscreen enabled device.

At block 510, the wireless device is communicatively coupled to the network. This step may be a result of a direct action by the user, and/or the device may automatically connect to the network when close enough to a casino property network access point.

The location of the device and the device constraints are then determined at block 512. Subsequently at block 514, the casino-defined user preference profile 511 and user-defined user preference profile 513 are updated and combined with the location information and casino player tracking information 515. The latest player points are then accessed at block 516, and a determination of the corresponding "comps" is made at block 518.

The "comps" may include a diverse grouping of casino services, including but not limited to comps for going to restaurants, comps for hotel rooms, comps for shows, comps for purchases at casino merchants, comps with casino partners, and other such complimentary goods and services that may be provided by the casino property.

At block 520, the method then proceeds to communicate the mobile autonomous dynamic GUI (MADGUI) to the wireless handset based on the following variables: location, user preference profile, and player comps.

After the MADGUI is served up, the player can interact with the MADGUI and at 522 the feedback is communicated back to a plurality of different databases that are then used to update the casino preference profile 511 and the user preference profile 513. Additionally at block 524, changes in location are also used to update and modify the MADGUI.

The illustrative method of FIG. 5 enables the players or guests to access their comps as a function of location and user preferences in a manner that is dynamic and targeted. Thus, the wireless handset becomes an extension of the service offering that is available to a casino guest or a player on the casino property.

Figure 6A:
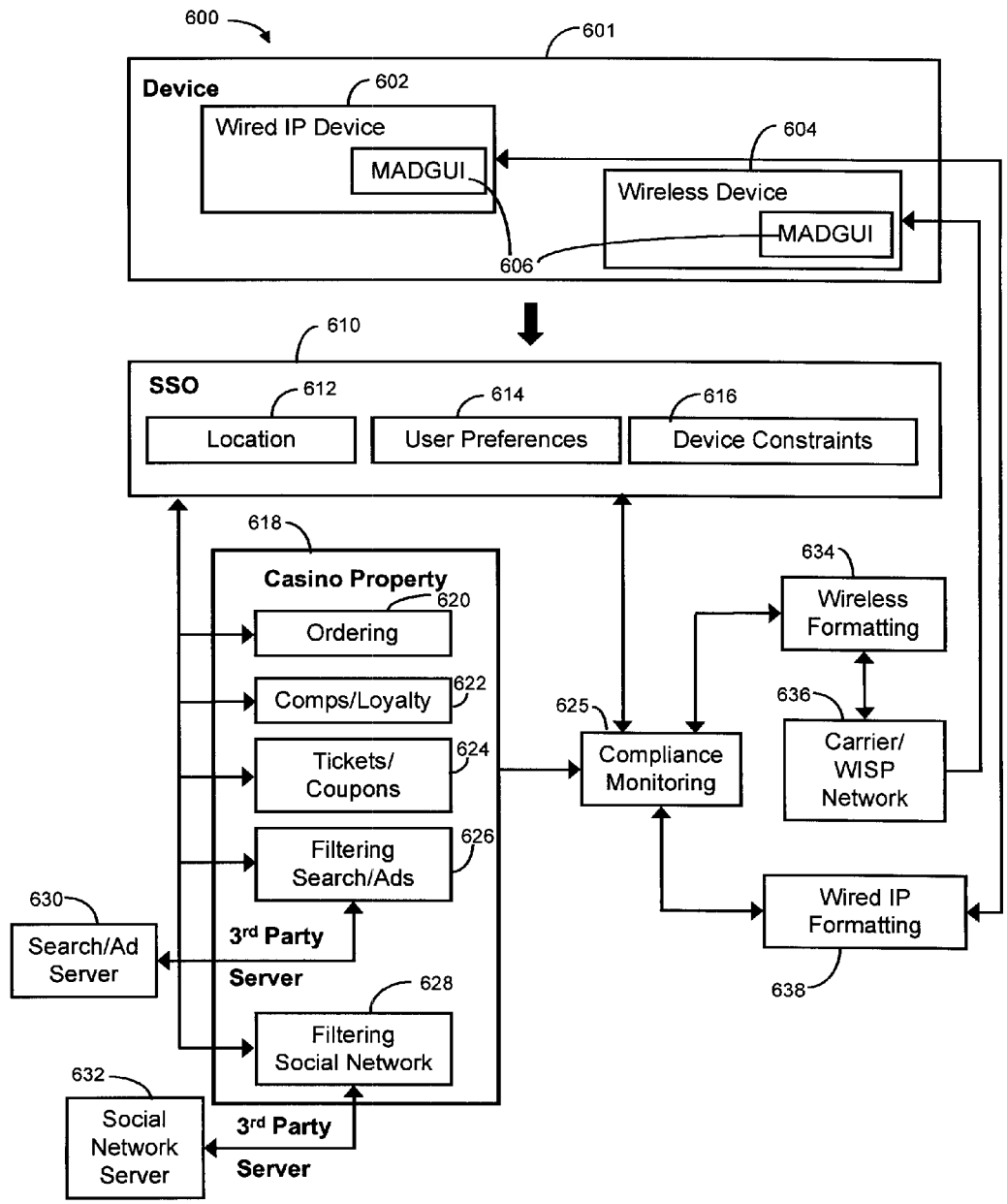
FIG. 6A shows a block diagram of the elements for a mobile autonomous dynamic graphical user interface system that would be used by an illustrative single merchant.

Referring to FIG. 6A there is shown a block diagram 600 of the elements for a mobile autonomous dynamic graphical user interface system that would be used by an illustrative single merchant. In the illustrative embodiment the single merchant is a casino property.

The system described in FIG. 6A is configured to generate a mobile autonomous dynamic graphical user interface (MADGUI) 606. The system's device block 601 shows a wired device 602 and a wireless device 604 that are each capable of presenting a graphical user interface (GUI) to the user. The Sense Survey and Optimize (SSO) block 610 includes a location-capable component 612 configured to determine the location for the wireless device and configured to communicate a plurality of location specific tags.

A location specific tag provides a location and a time stamp. The location tag may be stored on the wireless device, a server, or a combination thereof. By way of example and not of limitation, the location tags are collected on the wireless device and stored or cached in a wireless device memory. The location specific tags may be collected in intervals, e.g. every 30 seconds, or they may be triggered by movement of the device, or a combination thereof. The cached location specific tags may then be uploaded on regular intervals to a location positioning server or location positioning module as represented by location-capable component 612.

Additionally, a plurality of user preferences 614 are also accessed or communicated at the SSO 610 level. In the illustrative embodiment described below, the means for generating and analyzing a user-preference profile may include a user preference module or an intelligent agent user preference architecture.

The user preferences are defined broadly to include a historical and/or predictable understanding of a user's choices. With respect to the wireless device, the user preferences can be determined by an understanding of the user's location, user inputs, user responses, user feedback, user searches, and other such interactions with the wireless device. With respect to the illustrative brick-and-mortar merchant, e.g. casino, the user preferences can be determined by the user or player's transaction history and other activities that are followed with a casino property's player tracking system. With respect to search and interactions with an immobile wired personal computer, the user preferences can be determined by cookie tracking, tracking search strings, on-line surveys, and other such means for determining user preferences. With respect to social networks, user preferences can be determined by the particular user's profile and groups joined by users. With respect to on-line stores, user preferences can be determined based on the user's transactional history, items searched, comments or postings provided by the user, or the user's product or service feedback. For the illustrative systems described herein, the user preference profile can be captured by the wireless device, the illustrative brick-and-mortar merchant, searches and interactions with an immobile personal computer, social networks, on-line stores, or any combination thereof.

In addition to the user preferences described above, the user preference profile includes user preferences specific to the systems and methods described herein. For example, the user preference profile can include user-specific MADGUI results, feedback associated with the MADGUI, user opt-in preferences, user opt-out preferences, geographic search radius, or any combination thereof.

The illustrative user preference module 614 identifies the particular preferences associated with the particular user. The user preference module used to communicate the user preferences profile supports autonomous content searches and provides user-selectable menu buttons that satisfy the user preference profile. By way of example and not of limitation, the content and user-selectable menu buttons may be communicated as hyperlinks in a web browser operating on wireless device.

The illustrative user preference module 614 can be accessed according to a variety of illustrative triggers or conditions such as changes in location, entering and/or leaving a geo-fenced area, changes in nearby activities (e.g. change in flights, or change in concert line-ups, etc.), and other such triggers or conditions that would require accessing the user preference profile to generate the MADGUI.

Recall, the systems and methods described herein support a mobile autonomous dynamic graphical user interface (MADGUI). With respect to a wireless device, the MADGUI enables the wireless display to present a dynamic portal that changes independent of user input. Thus, the MADGUI can change even with little or no user input. The change to the MADGUI is triggered by changes in the user location, the user preference profile, the time, or any combination thereof.

The user preference module may also rely on an intelligent agent that is associated with the user, and the intelligent agent includes user preferences associated with a particular user. The intelligent agent architecture, either as a single agent system or as a multi agent system, communicates the user preferences profile, supports autonomous search for content, and provides user-selectable menu buttons that satisfy the user preference profile. By way of example and not of limitation, the content and user-selectable menu buttons may be communicated as hyperlinks in a web browser operating on a wireless device.

Additionally, the user accessing a personal computer can also achieve some of the benefits that a wireless user can achieve with the user preference intelligent agent.

Furthermore, at the SSO level the device constraints 616 are determined for the wireless device 604 and for the wired device 602. The device constraints are dependent on the limits of the system and device. Device constraints may include determining bandwidth constraints, screen size, processing speed, memory size and other such parameters critical to enabling the MADGUI 606 to operate smoothly. These device constraints are used for the wireless formatting in block 634 or wired IP formatting 638. Note, the wired IP formatting 638 supports the IPTV systems described herein.

The system also includes an integrated network server 618 configured to receive the location specific tags and the user preferences. The integrated network server 618 then proceeds to select targeted content based on the location specific tags and the user preferences profile. The selected targeted content may be ordering information 620 as described in further detail below, comps and/or loyalty information 622, tickets and/or coupons 624, accessing third party search results at 630, or accessing third party social networks at 632. Thus, the selected content may be picked by the user, the casino property, or a combination thereof. Note, that for third party content, the casino property can filter the search content and ad content at 626 to remove advertisements that are not consistent with the casino property and substitute offensive advertisements with the casino property advertisements. Additionally, social networking content may also be filtered at 628 to promote the casino property and its affiliates or leases.

During the process of generating the MADGUI, accommodations are made for generating at least one user selectable menu button. Note, the user selectable button may be associated with a telephone number so that a call may be made directly from the MADGUI. Additionally, the user selectable button may be associated with a hyperlink that is integrated into the MADGUI 606 and provides a simplified means for the user to access the selected content associated with the illustrative hyperlink. By way of example and not of limitation, the illustrative MADGUI 606 is embodied in a display menu, so the MADGUI's user selectable buttons occupy the entire wireless display or a portion of the wireless display.

The illustrative casino property integrated server 618 generates the dynamic display menu, i.e. MADGUI. Thus, the system includes a means for generating a display menu that is served to the wireless device, wherein the display menu includes one or more user-selectable menu buttons. Note, that the wired devices may not require a user selectable menu button. However, for the illustrative touch screen wireless handheld device, having a plurality of user selectable menu buttons simplifies the selection process.

Compliance monitoring 625 is performed on the "filtered" MADGUI content to ensure that the selected content is consistent with the user preferences profile, location, time, and device constraints. Note, a variety of different secondary filtering process may be necessary to ensure that content is properly filtered and that the menus displayed conform to device constraints, user preferences profile, time, the user location, the jurisdictional requirements, the merchant requirements, the carrier requirements, regulatory requirements, government requirements (local, county, state, federal, administrative, etc.), and other such content requirements.

For the wireless device, a wireless formatting engine 634 then receives the MADGUI content and formats the MADGUI or other filtered content for the wireless device. The MADGUI and/or filtered content are then communicated to the user via a carrier or wireless ISP network 636.

For the wired devices, a more detailed illustrative web page may be communicated directly to the wired device at 638 using a browser.

Note that for purposes of this patent, the term "display menu" refers to a single snapshot of the MADGUI 606. Recall that the display menus change as a function of such variables as location, time, user preferences, device constraints, accumulated player points, comps, and any combination thereof. The changing display menus result in the MADGUI.

Figure 6B:
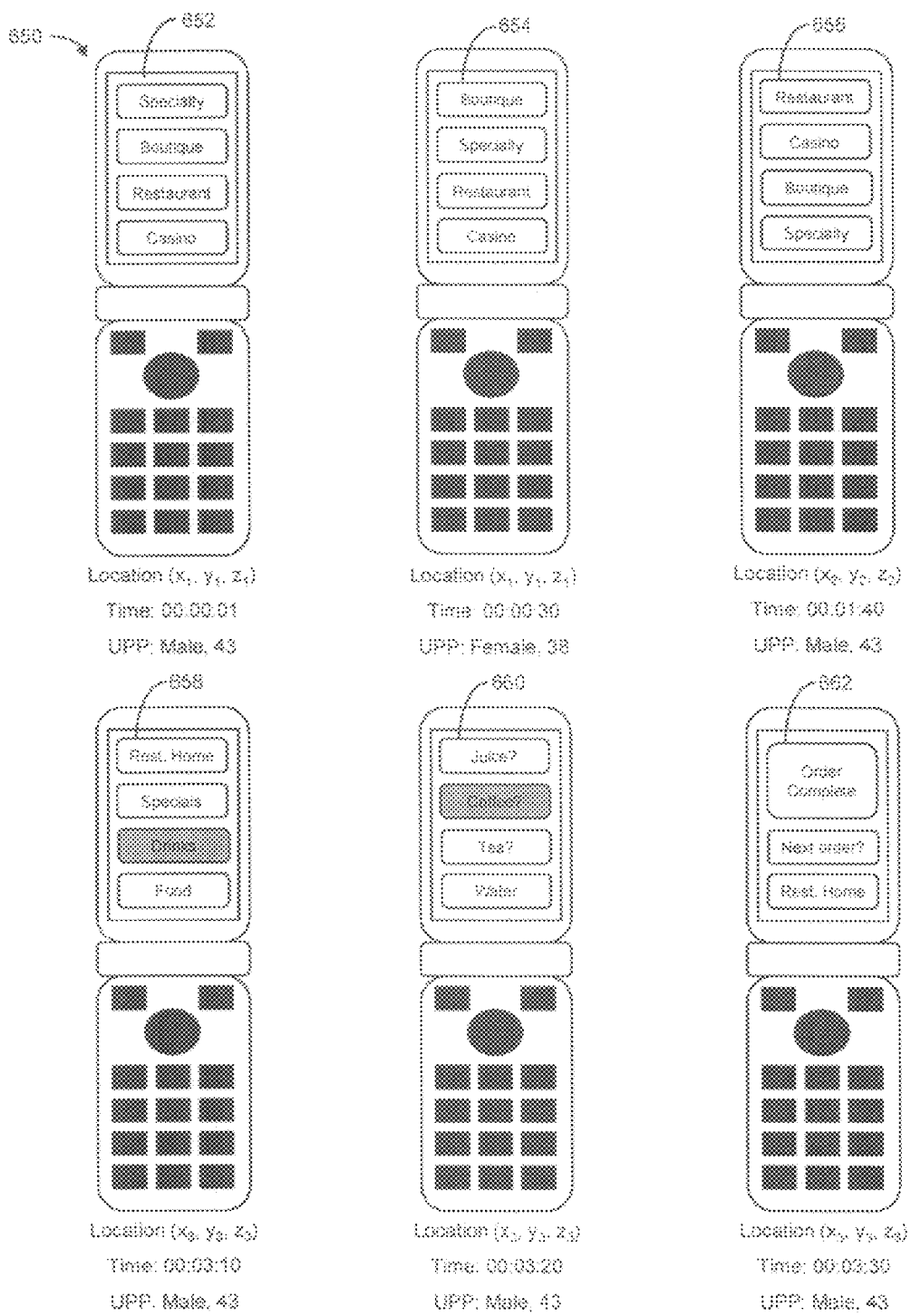
FIG. 6B shows an illustrative mobile autonomous dynamic graphical user interface that changes based on location, user preference profile, and time.

Referring to FIG. 6B there is shown an illustrative mobile autonomous dynamic graphical user interface that changes based on location, user preference profile, and time. An illustrative grouping of display menus 650 is presented in FIG. 6B. In the display menu 652, the user preference profile indicates that the user is 43-year-old male and the time is presented in hours, minutes and seconds. During the first second, the display menu 652 at location $x_1, y_1, z_1$, presents a four menu buttons, in which the top menu button is a Specialty store, e.g. bike store, the second menu button corresponds to a Boutique, the third menu button is associated with a restaurant, and the fourth button is a casino menu button. Using the navigation key on the wireless device, the user can select the desirable button.

Display menu 654 is for a different user, namely, a 38-year-old female. The female is at approximately the same location, namely, at location $x_1, y_1, z_1$ at approximately the same time, i.e. at the 30 second instance. The display menu 654 that is presented to the female user is different from the display menu 652 presented to the male user. With respect to the female user, the order of the menu buttons is different such that the Boutique menu button is the first menu button and the Specialty store menu button is the second menu button. Thus, the display menu 652 for the male user is different than the display menu 654 for the female user, even though both users are at the same location at approximately the same time.

In display menu 656 the user has now moved to location $x_2, y_2, z_2$, and the time has also changed to instance 00:01:40. Recall, the combination of the location and the time stamp define the location specific tag. At location $x_2, y_2, z_2$, the display menu 656 has changed—independent of user input. The change in the display menu has been triggered by a change in location so that now the first menu button is the Restaurant, the second menu button is the Casino, the third menu button is the Boutique and the fourth menu button is the Specialty store. Note that the change in the display menu 656 may also be dependent on the combination of the location and the user preference profile.

Continuing to display menu 658, the user has now entered the restaurant and is autonomously served up the restaurant home page in display menu 658. The time stamp indicates that the user is now at 00:03:10 and an ordering menu is presented to the user. The ordering menu includes a first menu button that is associated with the restaurant home page, the second menu button provides the daily specials, the third menu button is associated with drinks, and the fourth menu button is for food. Using the navigation key or the touch button display, the user selects the drinks menu button.

In display menu 660, the drinks menu is presented where the first menu button is for Juice, the second menu button is for Coffee, the third menu button is for Tea, the fourth menu button is for Water. The user selects the Coffee menu button. The coffee selection is then received by the restaurant. In operation, the restaurant proceeds to process the order.

Confirmation that the order has been processed is provided in display menu 662. Additionally, the confirmation order may also include the estimated time to fulfill the order. The display menu 662 includes a second button that is associated with placing a next order. The third menu button returns the user to the restaurant home page.

The combination of display menus 658, 660, and 662 presents a location based ordering solution where the MADGUI can be used to communicate an order and receive confirmation that the order has been received.

Figure 7:
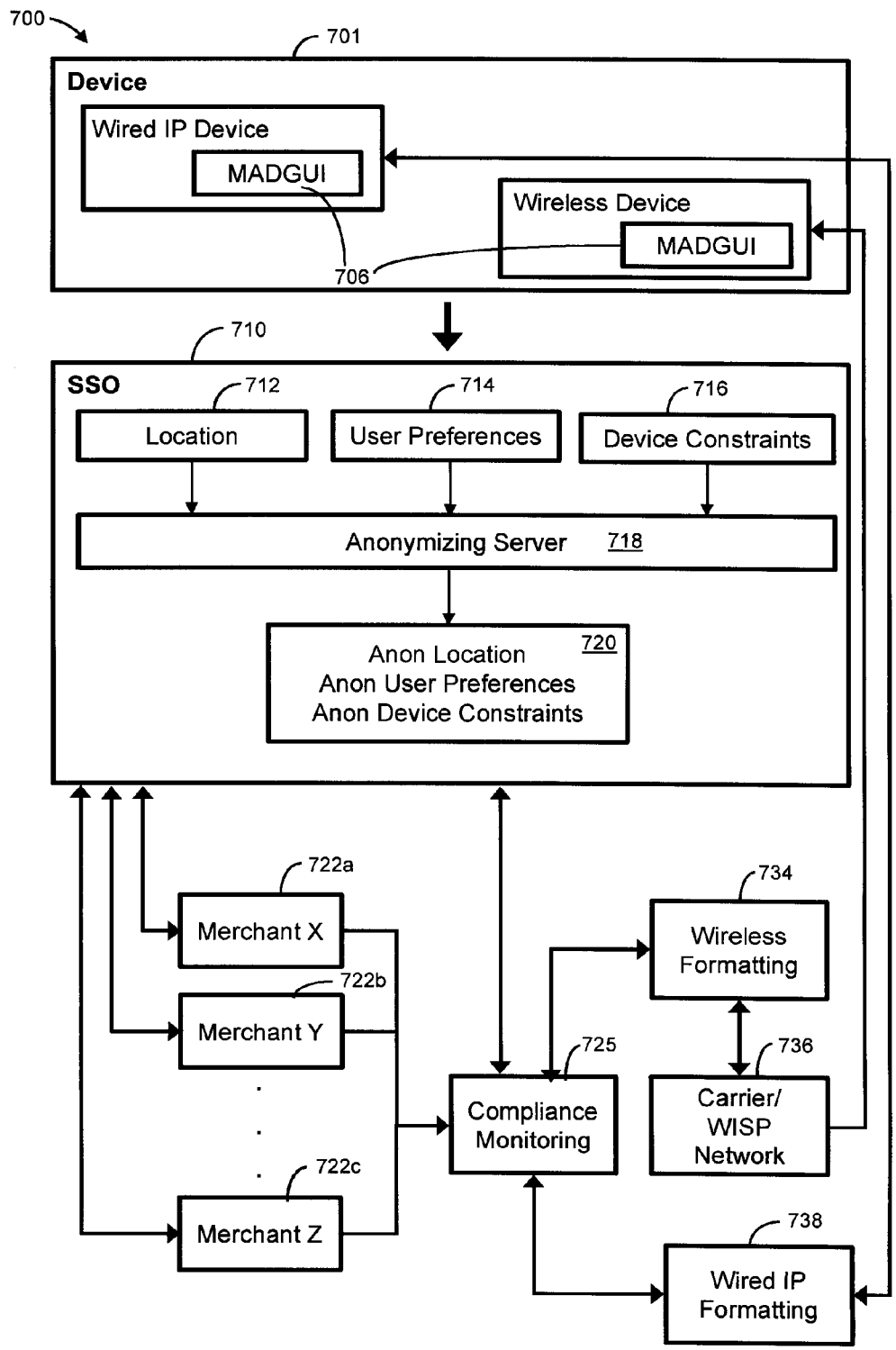
FIG. 7 shows a block diagram of the elements for a mobile autonomous dynamic graphical user interface system that would be used by a variety of different merchants.

Referring to FIG. 7 there is shown a block diagram 700 of the elements for a mobile autonomous dynamic graphical user interface system 706 that would be used by a variety of different merchants. The device block 701 is similar to the device block 601 in FIG. 6. However, the SSO block 710 includes additional elements, namely, an anonymizing network server 718 configured to receive the location specific tags and the user preferences and to anonymize the location specific tags 712 and user preferences 714 before communicating the anonymous user preferences and the anonymous location specific tags. The anonymizing server may also anonymize the device constraints 716, although this may not be a necessary step.

The resulting anonymous location, anonymous user preferences and anonymous device constraints at block 720 may then be served up to a variety of different merchants. Each merchant operates a third-party server 722 that is configured to receive the anonymous location specific tags and the anonymous user preferences 720 and to select targeted content based on the anonymous user preferences and the anonymous location specific tags 720. Again the selection of content includes calling, generating, or providing at least one user selectable menu button. By way of example and not of limitation, the user selectable menu buttons are hyperlinks presented on a mobile browser on the wireless device.

In one embodiment, the compliance monitoring component 725 receives the merchant information from a plurality of merchants and generates a multi-merchant display menu. Thus, the display menu includes selected content and user-selectable menu buttons. The display menu can be generated from a plurality of different merchants. Additionally, the compliance monitoring element 725 ensures the selected content and user selectable menu comply with the location requirements 712, the user preferences 714 and the device constraints 716.

Alternatively, the display menu may be generated by a single merchant and the compliance monitoring element 725 ensures the selected content and user-selectable menu comply with the location requirements 712, the user preferences 714 and the device constraints 716.

The illustrative display menu that is communicated to the illustrative wireless device enables the user to interact with the user-selectable menu buttons and to place a location-specific order from the user's wireless device.

An alternative display menu may be communicated to the illustrative wireless device that enables the user to interact with the user-selectable menu button and to interact with an advertisement that is communicated to the user based on the user preferences and the location of the wireless device.

For the wireless device, a wireless formatting engine 734 then receives the display menu and the selected content and formats the display menu and selected content for the wireless device. The selected content and display menu are then communicated to the user via a carrier or wireless ISP network 736.

For the wired devices, the display menu may be communicated directly to the wired device using a browser at 738.

As previously mentioned, the "display menu" refers to a single snapshot of the mobile autonomous dynamic graphical user interface (MADGUI) 706. The display menu changes as a function of such variables as location, time, user preference profile, device constraints, accumulated player points, comps, and any combination thereof. The changing display menus result in the MADGUI 706.

Figure 8:
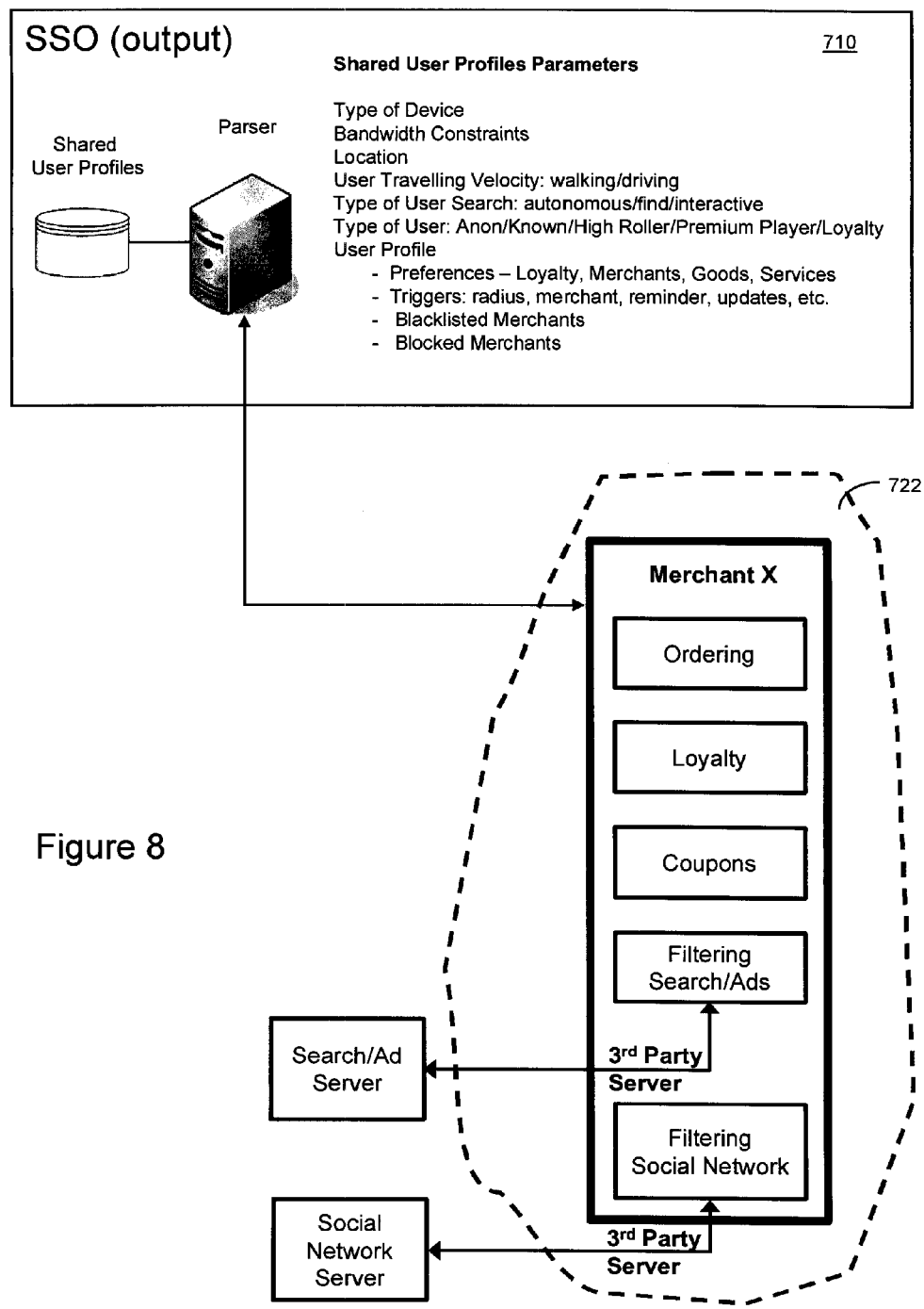
FIG. 8 shows a block diagram of the SSO component communicating with a particular merchant sub-system.

Referring to FIG. 8 there is shown a block diagram of the SSO component 710 communicating with a particular merchant sub-system 722. The merchant sub-system is similar to the integrated casino server described above. However, the physical footprint of the merchant may be substantially smaller than the casino property. Regardless, a similar set of services is provided as described above in FIG. 6. FIG. 8 also provides additional detail about the output generated by the SSO component.

The SSO component 710 includes a shared user profiles database and a parser. The shared user profile database includes information such as the type of device, bandwidth constraints, location, user traveling velocity status, type of user search status, the type of user, and the user profile preferences. The user travel velocity status distinguishes between a user traveling at walking speed or driving speed. The type of user search includes the autonomous MADGUI search, the manual find mobile search process, and the interactive process that is a combination of the MADGUI search with user feedback such as thumbs up and thumbs down. The type of user status can also be provided and includes the anonymous user, the known user status, the high roller player, the preferred player, and the loyalty program participant. The user preference profile may also include the preferred merchants, goods, and services. The user preference profile can also include the triggering or conditional radius, the opt-in merchants, calendar inputs such as reminders, and support for updated feeds, e.g. RSS feeds. Additionally, the illustrative user preference profile includes the opt-out merchants such as blacklisted merchants (never receive communications) and blocked merchants (only select merchant communications are received). The Parser is configured to communicated a variety of different user preference profiles depending on the merchant.

Figure 9:
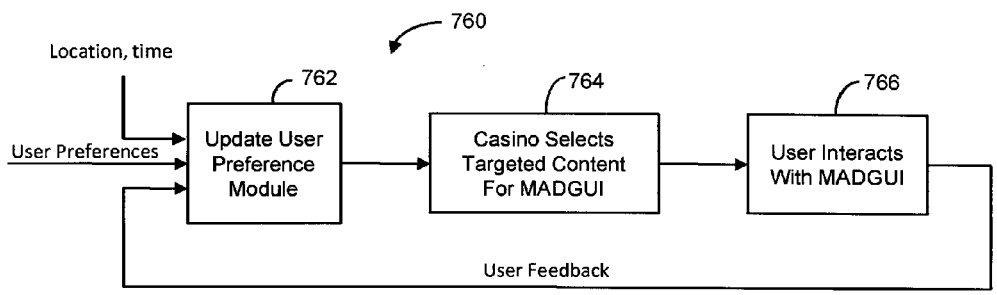
FIG. 9 shows a block diagram of a user preference module communicating with an illustrative single merchant.

Referring to FIG. 9 there is shown a block diagram of a means for updating and analyzing a user-preference profile with a user preference module. In FIG. 9, the illustrative means for generating and analyzing a user-preference profile 760 includes receiving location and time information and an existing user preference profile from an illustrative merchant such as a casino property. The user preference profile may be modified on a real-time basis or pseudo-real-time basis as a function of changes in location, time, user preferences and user feedback received at block 762. At block 764, the illustrative casino selects the targeted content that is served to the user. By way of example, the illustrative content may be the MADGUI. The user may then interact with the MADGUI at block 766 resulting in user feedback that is used to update the user preference module.

Figure 10:
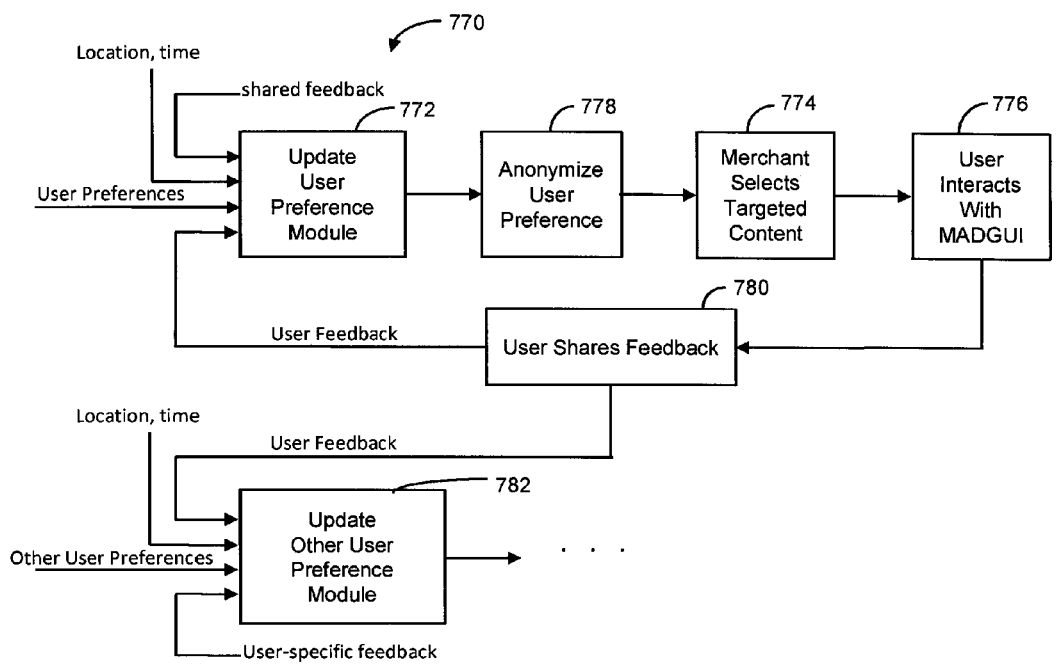
FIG. 10 shows a block diagram of a user preference module that generates anonymous user preferences and anonymous locations and shares feedback with similar users.

Referring to FIG. 10 there is shown a block diagram 770 of a means for updating and analyzing a user-preference profile that generates anonymous user preferences and anonymous locations and shares feedback with similar users. This presents a group approach to generating the optimal MADGUIs to similar users. By way of example and not of limitation, the process for updating the user profile may rely on an intelligent agent architecture that operates as an autonomous single agent system.

The illustrative means for updating and analyzing the user preference profile 770 may be embodied as part of the user preference module or as a separate group analytics and metrics engine (GAME).

By way of example, the group analytics and metrics engine 770 is modified on a real-time or pseudo-real-time basis as a function of changes in location, time, user preferences, and user feedback at block 772, and as a function of shared user feedback provided at block 780.

The illustrative group analytics and metrics engine also supports an anonymization process at block 778 so that the user preference may be served up to one or more merchants. Note that anonymizing block 778 may also be bypassed.

At block 774, the merchants can select the targeted content that is communicated to the user. The content is served in the form of a MADGUI as described above. The user then proceeds to interact with the content at block 776 resulting in user feedback that is communicated to a group of similar users and used to update another user preference profile at block 782. The group of similar users may be family members, friends, acquaintances, interested parties, or any combination thereof.

Figure 11:
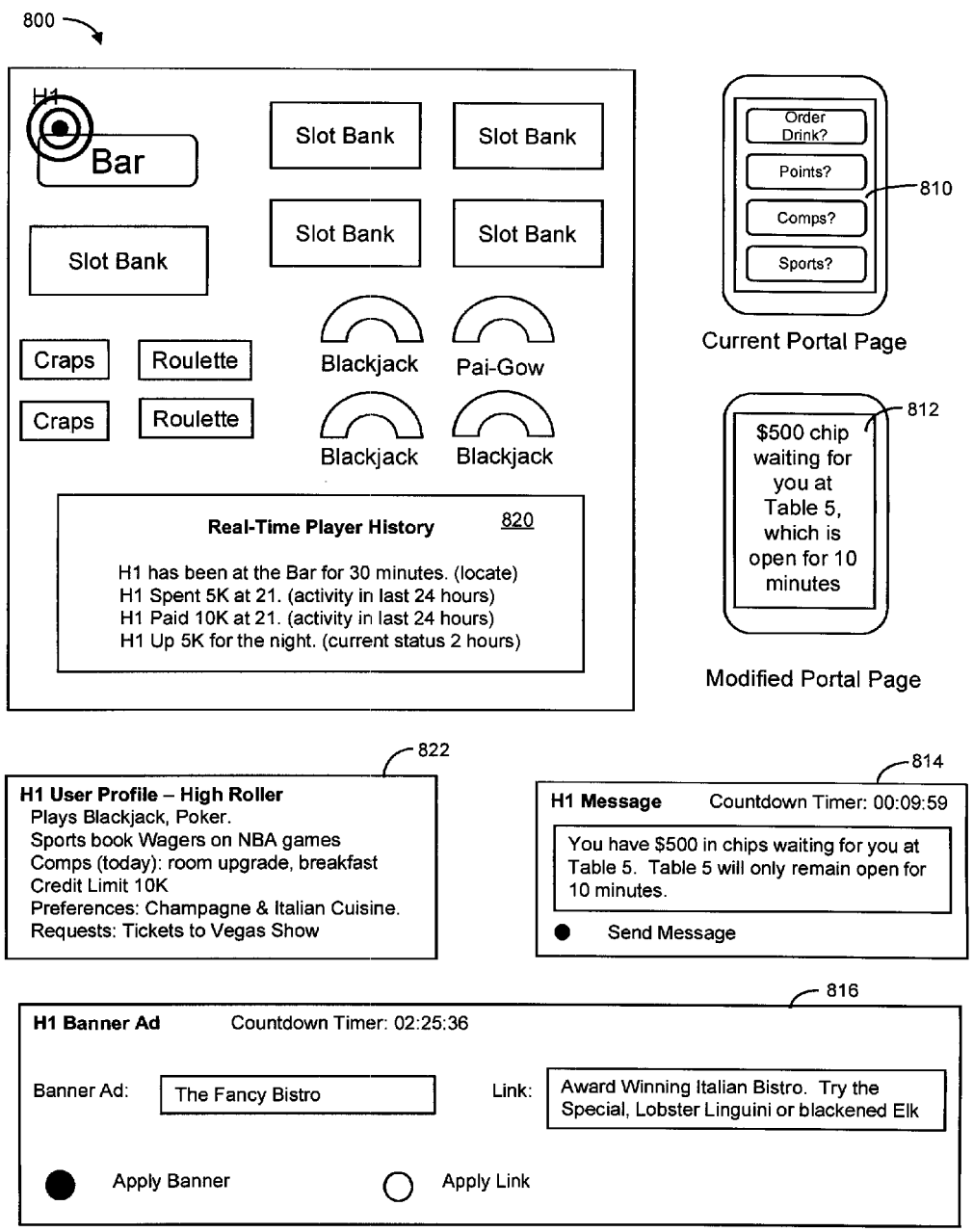
FIG. 11 shows an illustrative GUI that may be accessed by a pit boss to communicate with a particular player on the casino floor based on user preferences and location.

Referring to FIG. 11 there is shown an illustrative GUI 800 that may be accessed by a casino host to communicate with a particular player on the casino floor based on user preferences, time and location. For example, the casino host determines that the player has been sitting at the bar for a while. Since no activity has occurred for a predetermined period of time that is inconsistent with the player's wagering patterns, the casino host views the player's current display menu or "portal" page 810 and may elect to communicate a targeted SMS message based on viewing the player history 820 and player preferences 822. The casino host elects to send highly targeted content 814 to the player that $500 in chips is waiting. Additionally, the casino host elects to send the player a banner advertisement 816 about the casino's bistro. The message may also be communicated as an MMS, EMS, video stream, audiovisual stream, on a nearby IP display or monitor, on a web browser, as a hyperlink, or any combination thereof.

Figure 12:
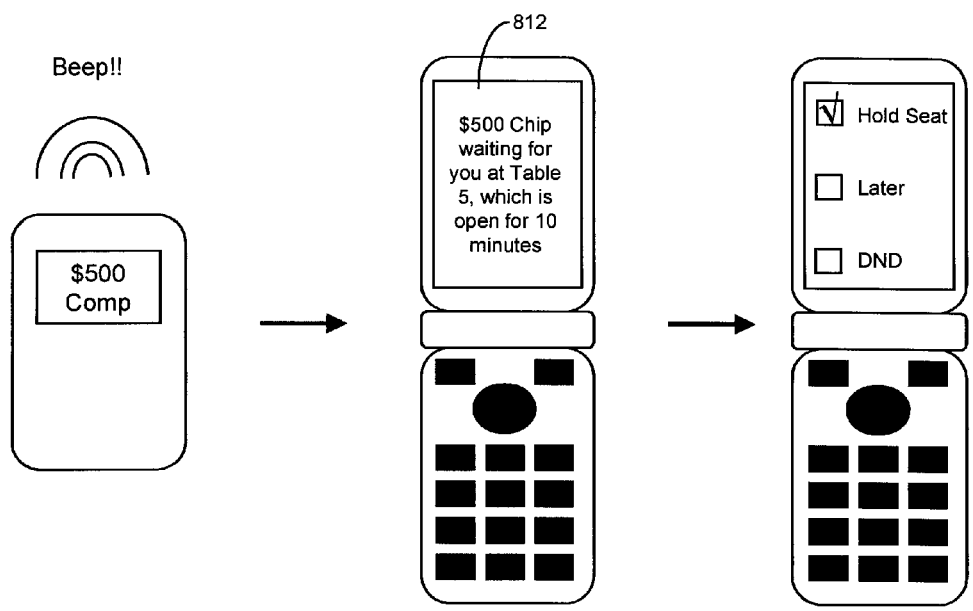
FIG. 12 shows the illustrative content generated by the pit boss in FIG. 11 being communicated to the player.

Referring to FIG. 12 there is shown the illustrative content 812 that is generated by the casino host in FIG. 11 being communicated to the player. In the instances described in FIG. 11 and FIG. 12, the casino host is acting as an agent of the casino property and the casino host is communicating highly targeted content to the player based on user preferences profile, location, time, player gaming history, or any combination thereof.

Figure 13:
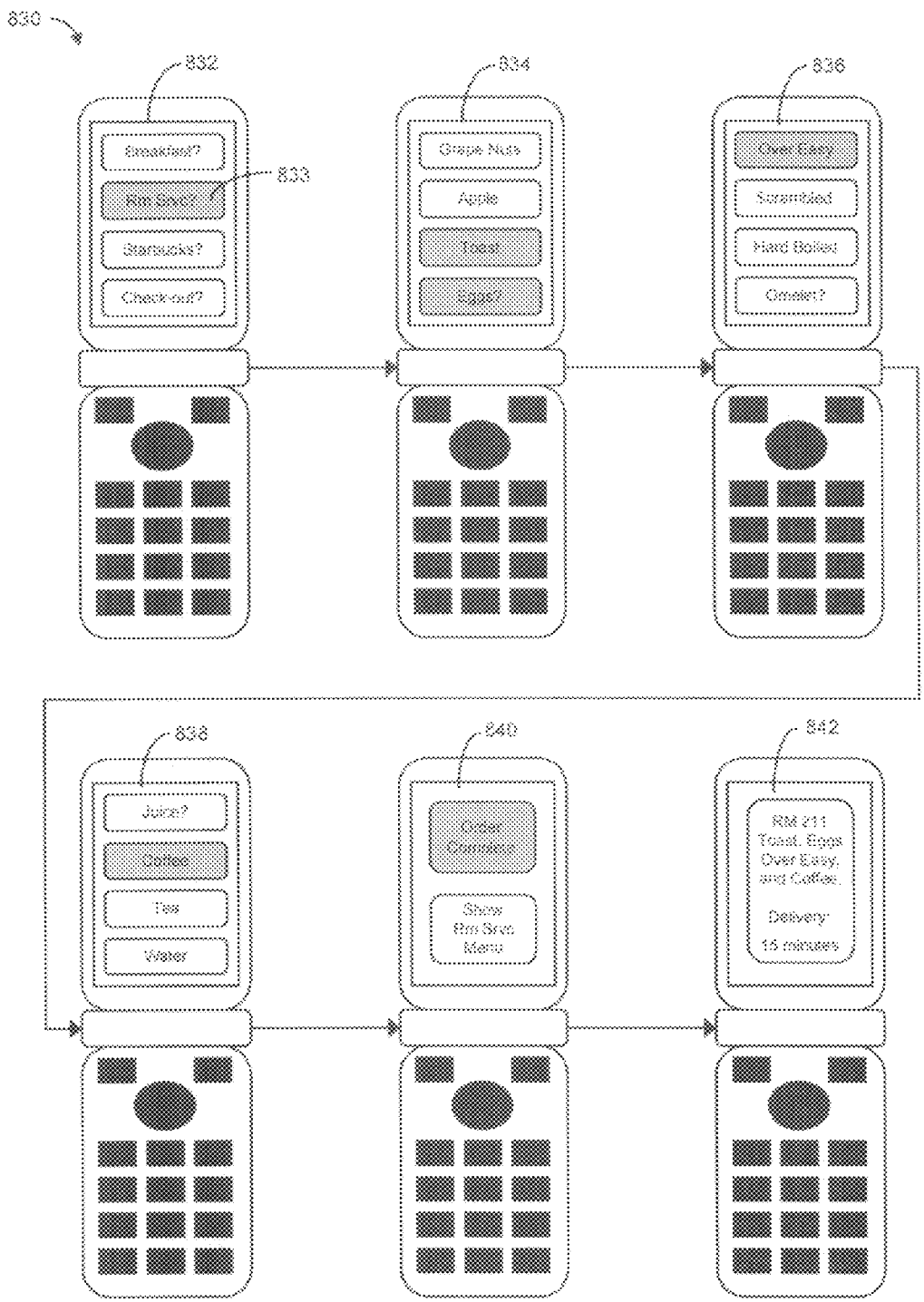
FIG. 13 shows an illustrative mobile autonomous dynamic graphical user interface that is displayed to a hotel guest when the hotel guest is in his hotel room.

Referring to FIG. 13 there is shown an illustrative mobile autonomous dynamic graphical user interface 830 that is displayed to a hotel guest when the hotel guest is in his hotel room. The illustrative MADGUI is used to generate a location-based order, and an ordering menu is served up to the hotel guest. In FIG. 13, the location, device constraints and user preferences profile have resulted in four user selectable buttons being displayed on the user's wireless handset at 832. The four selectable buttons enable to the user to order a variety of services, namely, pre-ordering meals, ordering room service, placing merchant orders, and simplifying hotel check-out.

Because it is early morning, the breakfast menu button is displayed at the top at 832. However, in FIG. 13, the user selects the room service button 833. The user is then provided with a list of particular user preferences, and the user selects toast and eggs at display menu 834. This user provides any additional information at 836, in this case the user selects eggs over easy. Continuing on, the user selects coffee at 838 and indicates the order is complete at 840. At 842, confirmation is received that the location-based order has been placed and has been received. A delivery time is also provided at 842.

Referring to FIG. 14, there is shown an illustrative GUI 850 where the user generates a comprehensive user preference profile from a desktop computer or laptop computer. During the process of generating the user preference profile at 852, the user provides general data about the user, creates an identity, and elects the individuals with whom to share the identity. The identity created by the use may represent a group based identity such as Wannabe Weekend Warrior. By way of example, the group identity may be associated with a social networking website and group formed within the social networking website.

Opt-in preferences are provided at block 854 and opt-out preferences are provided at block 864. The opt-in preferences show the user's preferred merchants that the user would like to receive updates from. Privacy settings are provided at 858. An opt-in radius 856 is provided that indicates a geographic radius for finding targeted content. The opt-in radius operates in a manner similar to a geo-fence and may be based on the user opt-in being automated at walking speed or driving speed. The opt-in radius 856 ranges from 10 feet to 5 miles and is associated with the user so that a user creates a user-defined geo-fence. Within this user-defined geo-fence, the user receives information that is consistent with the user preference profile.

At block 860, the user preference profile may be used for devices such as wireless mobile handsets, set-top boxes, personal computer, laptop computers, IPTV display, and other such electronic devices. The user can set the maximum number of advertisement to receive at block 862, and can elect to save some of the advertisements at block 866.

Figure 15:
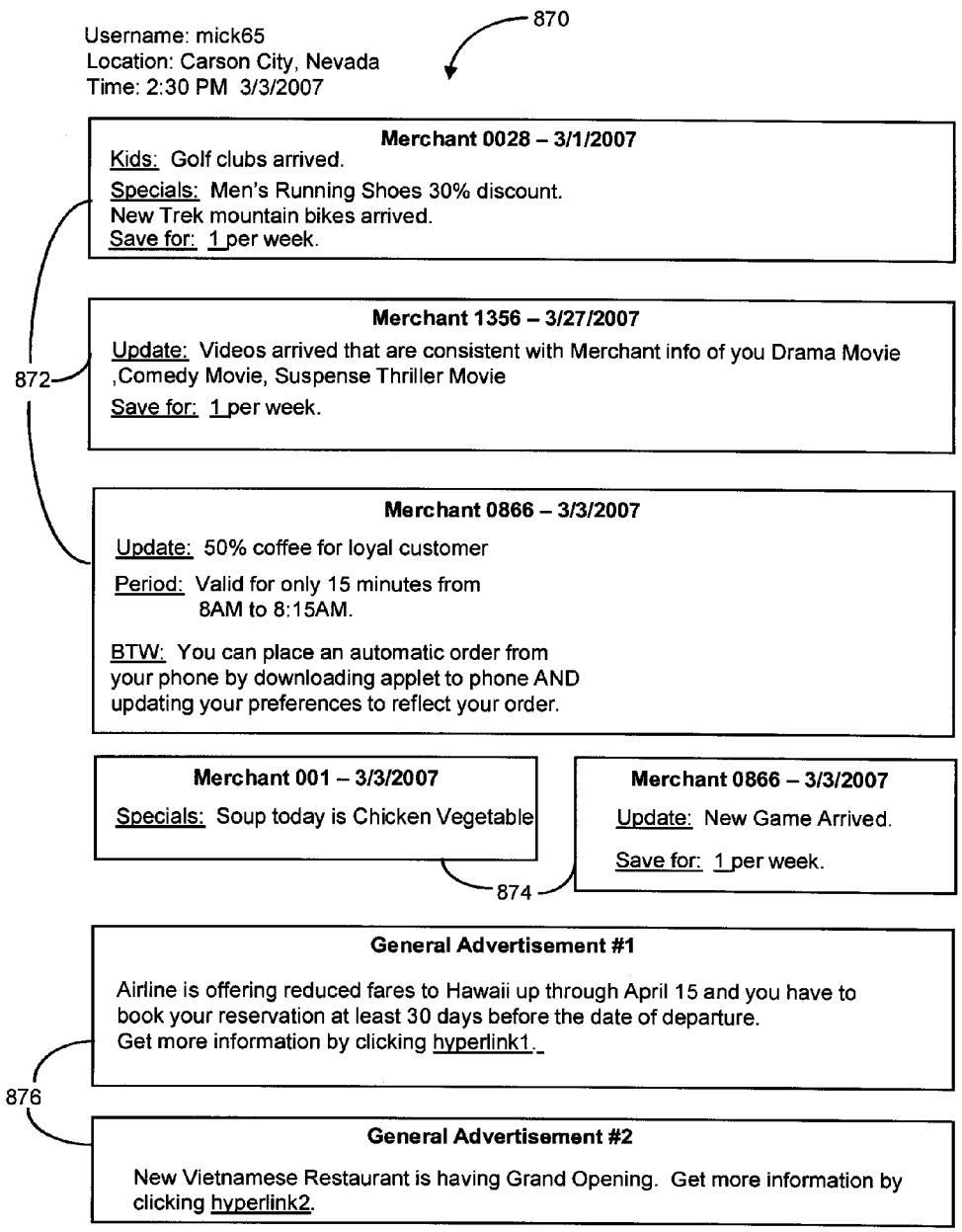
FIG. 15 shows an illustrative web page with output generated as a result of combining the user preference profile with route information collected from a location-capable component.

FIG. 15 shows an illustrative web page 870 with output generated as a result of combining the user preference profile with route information collected from a location-capable component. The web page indicates that a variety of opt-in merchants have received inventory, are placing products on sale, are providing loyalty based discounts, and have specials. The content of the web pages are generated based on the historical locations of the user and user preference profile. Note these merchants 872 and 874 are opt-in merchants that the user has elected to receive communications from.

By way of example and not of limitation, the opt-in merchant information may have been triggered by the user driving near the merchant causing updated information to be sent to the user's web page. Recall in FIG. 14, the user has set the geo-fence or "opt-in radius" to five miles so that the user can receive a variety of information autonomously if the merchant satisfies the user preference profile and is within five miles of the user's route.

Finally, some general advertisements 876 are provided that are communicated to the user based on the user preference profile, the user's location, the time, or a combination thereof. Some advertisements may be presented as banner ads.

It is to be understood that the foregoing is a detailed description of illustrative embodiments. The scope of the claims is not limited to these specific embodiments or examples. Therefore, various elements, details, execution of any methods, and uses can differ from those just described, or be expanded on or implemented using technologies not yet commercially viable, and yet still be within the concepts of the present disclosure. The scope of the invention is determined by the following claims and their legal equivalents.

What is claimed is:

1. A portable electronic device, comprising:
    a location identifying device that indicates a location of the portable electronic device and communicates the location of the portable electronic device to a networked component;
    a processor that presents a plurality of targeted content items, in which at least one targeted content item is associated with at least one group profile;
    the networked component selecting targeted content items based on the indoor location of the portable electronic device, a geofence associated with a targeted content item, and at least one group profile associated with the portable electronic device;
    the networked component generating a dynamic graphical user interface (GUI), in which a first dynamic GUI corresponding to a first group profile that is served to the portable electronic device is different from a second dynamic GUI corresponding to a second group profile that is served to a second portable electronic device at approximately the same indoor location, when the group profiles are different; and
    a first display associated with the portable electronic device that displays the targeted content items corresponding to the first dynamic GUI, when the portable electronic device enters or exits the geofence associated with the targeted content items.

2. The portable electronic device of claim 1, wherein the networked component is associated with a casino, and wherein the location identifying device indicates the location of the portable electronic device in a casino environment.

3. The portable electronic device of claim 1, wherein the first group profile includes a first user profile created by a merchant.

4. The portable electronic device of claim 1, wherein the first group profile includes a second user profile created by the user.

5. The portable electronic device of claim 1, wherein the targeted content items are further selected based on a set of device constraints of the portable electronic device.

6. The portable electronic device of claim 5, wherein the device constraints include a bandwidth constraint, a screen size, a processing speed, and a memory size.

7. The portable electronic device of claim 1, wherein the targeted content items are further selected based on a current time.

8. A portable electronic device, comprising:
   a location identifying device indicating a location of the portable electronic device and communicating the location of the portable electronic device to a networked component;
   a processor that presents a plurality of targeted content items, in which at least one targeted content item is associated with at least one group profile;
   the networked component selecting targeted content items based on the indoor location of each the portable electronic device, a geofence associated with a targeted content item, and at least one group profile associated with the portable electronic device;
   the networked component generating a dynamic graphical user interface (GUI), in which a first dynamic GUI corresponding to a first group profile that is served to the portable electronic device is different from a second dynamic GUI corresponding to a second group profile that is served to a second portable electronic device at approximately the same indoor location, when the group profiles are different; and
   a first display associated with the portable electronic device that displays the targeted content items corresponding to the first dynamic GUI, when the portable electronic device enters or exits the geofence associated with the targeted content items; and
   wherein the targeted content items includes a user selectable menu that receives a location-specific order from the portable electronic device, wherein the menu includes a plurality of menu options based on the user profile and the location of the portable electronic device.

9. The portable electronic device of claim 8, wherein the networked component is associated with a casino, and wherein the location identifying device indicates the location of the portable electronic device in a casino environment.

10. The portable electronic device of claim 8, wherein the first group profile includes a first user profile created by a merchant.

11. The portable electronic device of claim 8, wherein the first group profile includes a second user profile created by the user.

12. The portable electronic device of claim 8, wherein the targeted content items are further selected based on a set of device constraints of the portable electronic device.

13. The portable electronic device of claim 12, wherein the device constraints include a bandwidth constraint, a screen size, a processing speed, and a memory size.

14. The portable electronic device of claim 8, wherein the targeted content items are further selected based on a current time.

15. A method for receiving targeted content on a portable electronic device, comprising:
   determining a location of the portable electronic device and communicating the location of the portable electronic device to a networked component;
   receiving a plurality of targeted content items from the networked component, in which at least one targeted content item is associated with at least one group profile;
   enabling the networked component to select targeted content based on the indoor location of the portable electronic device, a geofence associated with the targeted content, and at least one group profile associated with the portable electronic device;
   enabling the networked component to generate a dynamic graphical user interface (GUI), in which a first dynamic GUI corresponding to a first group profile that is served to the portable electronic device is different from a second dynamic GUI corresponding to a second group profile that is served to a second portable electronic device at approximately the same indoor location, when the group profiles are different;
   storing the targeted content items in a portable electronic device memory; and
   presenting the targeted content items on a display associated with the portable electronic device, when the portable electronic device enters or exits the geofence associated with the targeted content items.

16. The method of claim 15, wherein the targeted content items includes a user selectable menu that receives a location-specific order from the portable electronic device, wherein the menu includes one or more menu options based on the group profile and the location of the portable electronic device.

17. The method of claim 15, wherein the first group profile includes a first user profile created by a merchant.

18. The method of claim 17, further comprising:
   enabling the user of the portable electronic device to create a second user profile; and
   communicating the second user profile to the networked component, wherein the first group profile includes the second user profile.

19. The method of claim 15, wherein the targeted content is further selected based on a set of device constraints of the portable electronic device.

20. The method of claim 19, wherein the device constraints include a bandwidth constraint, a screen size, a processing speed, and a memory size.

* * * * *